US008674021B2

(12) United States Patent
Rodrigues et al.

(10) Patent No.: US 8,674,021 B2
(45) Date of Patent: *Mar. 18, 2014

(54) SULFONATED GRAFT COPOLYMERS

(75) Inventors: Klin A. Rodrigues, Signal Mountain, TN (US); Jannifer Sanders, Hixson, TN (US)

(73) Assignee: Akzo Nobel N.V., Arnhem (NL)

( * ) Notice: Subject to any disclaimer, the term of this patent is extended or adjusted under 35 U.S.C. 154(b) by 1032 days.

This patent is subject to a terminal disclaimer.

(21) Appl. No.: 11/780,493

(22) Filed: Jul. 20, 2007

(65) Prior Publication Data

US 2008/0020948 A1    Jan. 24, 2008

Related U.S. Application Data

(63) Continuation-in-part of application No. 11/459,225, filed on Jul. 21, 2006, now abandoned.

(51) Int. Cl.
| C08G 63/48 | (2006.01) |
| C08G 63/91 | (2006.01) |
| C09K 8/08  | (2006.01) |
| C09K 8/60  | (2006.01) |

(52) U.S. Cl.
USPC .................. 525/54.31; 507/111; 507/212

(58) Field of Classification Search
USPC .............. 525/54.3, 54.31; 507/110, 111, 211, 507/212
See application file for complete search history.

(56) References Cited

U.S. PATENT DOCUMENTS

| 2,536,658 A | 1/1951 | Rheineck |
| 2,798,053 A | 7/1957 | Brown |
| 2,954,347 A | 9/1960 | St. John et al. |
| 3,048,548 A | 8/1962 | Martin et al. |
| 3,308,067 A | 3/1967 | Diehl |
| 3,314,891 A | 4/1967 | Schmolka |
| 3,334,147 A | 8/1967 | Brunelle et al. |
| 3,442,242 A | 5/1969 | Laskey et al. |
| 3,455,839 A | 7/1969 | Rauner |
| 3,518,176 A | 6/1970 | Reyes et al. |
| 3,629,121 A | 12/1971 | Eldib |
| 3,639,312 A | 2/1972 | Turner |
| 3,673,148 A | 6/1972 | Vasta |
| 3,687,878 A | 8/1972 | Imoto et al. |
| 3,723,322 A | 3/1973 | Diehl |
| 3,803,285 A | 4/1974 | Jensen |
| 3,929,107 A | 12/1975 | Renger |
| 3,929,678 A | 12/1975 | Laughlin et al. |
| 3,933,672 A | 1/1976 | Bartolotta et al. |
| 4,048,122 A | 9/1977 | Sibley et al. |
| 4,131,576 A | 12/1978 | Iovine et al. |
| 4,133,779 A | 1/1979 | Hellyer et al. |
| 4,141,841 A | 2/1979 | McDanald |
| 4,228,042 A | 10/1980 | Letton |
| 4,239,660 A | 12/1980 | Kingry |
| 4,260,529 A | 4/1981 | Letton |
| 4,265,779 A | 5/1981 | Gandolfo et al. |
| 4,322,472 A | 3/1982 | Kaspar et al. |
| 4,374,035 A | 2/1983 | Bossu |
| 4,379,080 A | 4/1983 | Murphy |
| 4,388,205 A | 6/1983 | Stettler et al. |
| 4,412,934 A | 11/1983 | Chung et al. |
| 4,483,779 A | 11/1984 | Llenado et al. |
| 4,483,780 A | 11/1984 | Llenado |
| 4,521,578 A | 6/1985 | Chen et al. |
| 4,536,314 A | 8/1985 | Hardy et al. |
| 4,539,130 A | 9/1985 | Thompson et al. |
| 4,557,763 A | 12/1985 | George et al. |
| 4,565,647 A | 1/1986 | Llenado |
| 4,597,898 A | 7/1986 | Vander Meer |
| 4,605,721 A | 8/1986 | Jenkins et al. |
| 4,606,838 A | 8/1986 | Burns |
| 4,618,914 A | 10/1986 | Sato et al. |
| 4,634,551 A | 1/1987 | Burns et al. |
| 4,652,392 A | 3/1987 | Baginski et al. |
| 4,671,891 A | 6/1987 | Hartman |
| 4,681,592 A | 7/1987 | Hardy et al. |
| 4,681,695 A | 7/1987 | Divo |
| 4,681,704 A | 7/1987 | Bernardino et al. |
| 4,686,063 A | 8/1987 | Burns |
| 4,702,857 A | 10/1987 | Gosselink |
| 4,782,901 A | 11/1988 | Phelps et al. |
| 4,830,773 A | 5/1989 | Olson |
| 4,855,069 A | 8/1989 | Schuppiser et al. |
| 4,963,629 A | 10/1990 | Driemel et al. |

(Continued)

FOREIGN PATENT DOCUMENTS

| CA | 2074747 | 2/1993 |
| CN | 1087649 A | 6/1997 |

(Continued)

OTHER PUBLICATIONS

European Search Report for Application No. EP07014412; Completion Date Jan. 23, 2008, from copending U.S. Appl. No. 11/780,494, filed Jul. 20, 2007.
Odian, Principles of Polymerization, 2nd Ed., John Wiley & Sons, p. 226, New York (1981).
Menger et al. "Gemini Surfactants: A New Class of Self-Assembling Molecules," J. American Chemical Soc., 115, pp. 10083-10090 (1993).
"Geminis: A New Generation of Surfactants," Chemtech, pp. 30-33 (Mar. 1993).
Kirk Othmer Encyclopedia of Chemical Technology, 3rd Ed, vol. 7, pp. 430-447 (John Wiley & Sons, Inc., 1979).
Wurzburg, O.B., Modified Starches: Properties and Uses, Grafted Starches; Chpt. 10; pp. 149-172; CRC Press (1986).
Dubois et al., "Colormetric method for determination of sugars and related substances," Anal. Chem. vol. 28, No. 3, p. 350-356 (1956).
Concise Encyclopedia of Polymer Science and Engineering, J.I. Kroschwitz, ed., Wiley-Interscience, New York, p. 436 (1990).
Mark, Herman F., Concise Encyclopedia of Polymer Science and Technology, 3rd Ed., vol. 11, Wiley-Interscience, New York, p. 380 (2004).

(Continued)

Primary Examiner — Liam Heincer
(74) Attorney, Agent, or Firm — James C. Abruzzo

(57) ABSTRACT

Sulfonated graft copolymer obtained by radical graft copolymerization of one or more synthetic monomers in the presence of hydroxyl-containing naturally derived materials. The graft copolymer includes 0.1 to 100 wt %, based on weight of the total synthetic monomers, of at least one monoethylenically unsaturated monomer having a sulfonic acid group, monoethylenically unsaturated sulfuric acid ester or salt thereof, with the monomer and hydroxyl-containing naturally derived materials present in a weight ratio of 5:95 to 95:5.

26 Claims, No Drawings

(56) References Cited

U.S. PATENT DOCUMENTS

| | | |
|---|---|---|
| 4,968,451 A | 11/1990 | Scheibel et al. |
| 5,032,659 A | 7/1991 | Heidel |
| 5,071,895 A | 12/1991 | Hughes et al. |
| 5,076,968 A | 12/1991 | Fringeli et al. |
| 5,121,795 A | 6/1992 | Ewert et al. |
| 5,125,455 A | 6/1992 | Harris et al. |
| 5,223,171 A | 6/1993 | Jost et al. |
| 5,227,446 A | 7/1993 | Denzinger et al. |
| 5,248,449 A | 9/1993 | Mitchell et al. |
| 5,264,470 A | 11/1993 | Eoff |
| 5,296,470 A | 3/1994 | Vaslin et al. |
| 5,304,620 A | 4/1994 | Holtmyer et al. |
| 5,326,864 A | 7/1994 | Besemer et al. |
| 5,332,528 A | 7/1994 | Pan et al. |
| 5,378,830 A | 1/1995 | Yeh |
| 5,385,959 A | 1/1995 | Tsaur et al. |
| 5,412,026 A | 5/1995 | Holy et al. |
| 5,415,807 A | 5/1995 | Gosselink et al. |
| 5,435,935 A | 7/1995 | Kupneski |
| 5,478,503 A | 12/1995 | Swift |
| 5,500,154 A | 3/1996 | Bacon et al. |
| 5,501,815 A | 3/1996 | Man |
| 5,518,646 A | 5/1996 | Van den Brom |
| 5,518,657 A | 5/1996 | Fringeli et al. |
| 5,523,023 A | 6/1996 | Kleinstuck et al. |
| 5,543,459 A | 8/1996 | Hartmann et al. |
| 5,547,612 A | 8/1996 | Austin et al. |
| 5,565,145 A | 10/1996 | Watson et al. |
| 5,580,154 A | 12/1996 | Coulter et al. |
| 5,580,941 A | 12/1996 | Krause et al. |
| 5,583,193 A | 12/1996 | Aravindakshan et al. |
| 5,654,198 A | 8/1997 | Carrier et al. |
| 5,656,646 A | 8/1997 | Perner et al. |
| 5,658,651 A | 8/1997 | Smith et al. |
| 5,670,475 A | 9/1997 | Trinh et al. |
| 5,674,511 A | 10/1997 | Kacher et al. |
| 5,753,770 A | 5/1998 | Breitenbach et al. |
| 5,756,442 A | 5/1998 | Jeschke et al. |
| 5,760,154 A | 6/1998 | Krause et al. |
| 5,830,241 A | 11/1998 | Rohringer et al. |
| 5,852,069 A | 12/1998 | Meister et al. |
| 5,854,191 A | 12/1998 | Krause et al. |
| 5,854,321 A | 12/1998 | Krause et al. |
| 5,869,070 A | 2/1999 | Dixon et al. |
| 5,942,477 A | 8/1999 | Giret et al. |
| 5,942,479 A | 8/1999 | Frankenbach et al. |
| 5,942,485 A | 8/1999 | Kemen |
| 5,945,127 A | 8/1999 | Breitenbach et al. |
| 5,952,278 A | 9/1999 | Mao et al. |
| 5,977,275 A | 11/1999 | Rodrigues et al. |
| 5,985,809 A | 11/1999 | Frankenbach et al. |
| 5,990,065 A | 11/1999 | Vinson et al. |
| 6,004,922 A | 12/1999 | Watson et al. |
| 6,008,181 A | 12/1999 | Cripe et al. |
| 6,020,303 A | 2/2000 | Cripe et al. |
| 6,022,844 A | 2/2000 | Bailelly et al. |
| 6,025,311 A | 2/2000 | Clarke et al. |
| 6,060,299 A | 5/2000 | Sreekrishna et al. |
| 6,060,443 A | 5/2000 | Cripe et al. |
| 6,060,582 A | 5/2000 | Hubbell et al. |
| 6,069,122 A | 5/2000 | Vinson et al. |
| 6,093,856 A | 7/2000 | Cripe et al. |
| 6,103,839 A | 8/2000 | Patel et al. |
| 6,106,849 A | 8/2000 | Malkan et al. |
| 6,130,194 A | 10/2000 | Pancheri et al. |
| 6,136,769 A | 10/2000 | Asano et al. |
| 6,143,707 A | 11/2000 | Trinh et al. |
| 6,150,322 A | 11/2000 | Singleton et al. |
| 6,153,570 A | 11/2000 | Decoster |
| 6,153,577 A | 11/2000 | Cripe et al. |
| 6,162,423 A | 12/2000 | Sebag et al. |
| 6,169,062 B1 | 1/2001 | Salager et al. |
| 6,194,362 B1 | 2/2001 | Trinh et al. |
| 6,221,825 B1 | 4/2001 | Williams, Jr. et al. |
| 6,225,462 B1 | 5/2001 | Berry et al. |
| 6,231,650 B1 | 5/2001 | Mallow et al. |
| 6,255,427 B1 | 7/2001 | Exner et al. |
| 6,303,560 B1 | 10/2001 | Hartan et al. |
| 6,365,561 B1 | 4/2002 | Vinson et al. |
| 6,372,708 B1 | 4/2002 | Kasturi et al. |
| 6,376,438 B1 | 4/2002 | Rosenberger et al. |
| 6,384,132 B1 | 5/2002 | Horley et al. |
| 6,423,775 B1 | 7/2002 | Brune et al. |
| 6,451,747 B1 | 9/2002 | Decoster |
| 6,482,994 B2 | 11/2002 | Scheper et al. |
| 6,528,477 B2 | 3/2003 | Kasturi et al. |
| 6,537,957 B1 | 3/2003 | Cardola et al. |
| 6,573,234 B1 | 6/2003 | Sivik et al. |
| 6,589,926 B1 | 7/2003 | Vinson et al. |
| 6,605,182 B1 | 8/2003 | Danner |
| 6,627,590 B1 | 9/2003 | Sherry et al. |
| 6,645,925 B2 | 11/2003 | Sivik et al. |
| 6,656,900 B2 | 12/2003 | Sivik et al. |
| 6,764,992 B2 | 7/2004 | Kumar et al. |
| 6,800,712 B2 | 10/2004 | Doane et al. |
| 6,908,955 B2 | 6/2005 | Porsch et al. |
| 6,911,053 B1 | 6/2005 | Bijsterbosch et al. |
| 7,012,048 B2 | 3/2006 | Drovetskaya et al. |
| 7,087,662 B2 | 8/2006 | Ghosh et al. |
| 7,151,079 B2 | 12/2006 | Fack et al. |
| 7,153,821 B2 | 12/2006 | Blokzijl et al. |
| 7,157,413 B2 | 1/2007 | Lazzeri et al. |
| 7,435,293 B2 | 10/2008 | Caveny et al. |
| 7,589,051 B2 | 9/2009 | Erazo-Majewicz et al. |
| 7,670,388 B2 | 3/2010 | Sugano et al. |
| 7,727,945 B2 | 6/2010 | Rodrigues et al. |
| 7,740,873 B2 | 6/2010 | Decoster et al. |
| 7,754,666 B2 | 7/2010 | Walters et al. |
| 7,902,276 B2 | 3/2011 | Sakai et al. |
| 2002/0016282 A1 | 2/2002 | Kumar et al. |
| 2002/0034487 A1 | 3/2002 | Maubru et al. |
| 2002/0055446 A1 | 5/2002 | Perron et al. |
| 2002/0106747 A1 | 8/2002 | Cheng et al. |
| 2002/0173592 A1 | 11/2002 | Saeki et al. |
| 2003/0008793 A1 | 1/2003 | Takiguchi et al. |
| 2003/0008804 A1 | 1/2003 | Xu et al. |
| 2003/0092584 A1 | 5/2003 | Crews |
| 2003/0147827 A1 | 8/2003 | Decoster et al. |
| 2003/0147842 A1 | 8/2003 | Restle et al. |
| 2003/0211952 A1 | 11/2003 | Erazo-Majewicz et al. |
| 2004/0033929 A1 | 2/2004 | Bertleff et al. |
| 2004/0039137 A1 | 2/2004 | Heinemann et al. |
| 2004/0048760 A1 | 3/2004 | Rabon et al. |
| 2004/0067864 A1 | 4/2004 | Aubay et al. |
| 2004/0067865 A1 | 4/2004 | Harrison |
| 2004/0071742 A1 | 4/2004 | Popplewell et al. |
| 2004/0092425 A1 | 5/2004 | Boutique et al. |
| 2004/0102354 A1 | 5/2004 | Fack et al. |
| 2004/0103483 A1 | 6/2004 | Delplancke et al. |
| 2004/0107505 A1 | 6/2004 | Harrison et al. |
| 2004/0147425 A1 | 7/2004 | Castro et al. |
| 2004/0170596 A1 | 9/2004 | Hauschel et al. |
| 2004/0214736 A1 | 10/2004 | Modi |
| 2004/0266653 A1 | 12/2004 | Delplancke et al. |
| 2004/0266655 A1 | 12/2004 | Baum et al. |
| 2005/0019352 A1 | 1/2005 | Mercier et al. |
| 2005/0028293 A1 | 2/2005 | Geffroy |
| 2005/0108832 A1 | 5/2005 | Torri et al. |
| 2005/0143278 A1 | 6/2005 | Pegelow et al. |
| 2005/0171287 A1 | 8/2005 | Baum et al. |
| 2005/0175572 A1 | 8/2005 | Nguyen-Kim et al. |
| 2005/0176878 A1 | 8/2005 | Ettl et al. |
| 2005/0202985 A1 | 9/2005 | Nieendick et al. |
| 2005/0202989 A1 | 9/2005 | Wilson |
| 2005/0215449 A1 | 9/2005 | Penninger et al. |
| 2005/0256027 A1 | 11/2005 | Heibel et al. |
| 2005/0267008 A1 | 12/2005 | Carvell et al. |
| 2005/0271595 A1 | 12/2005 | Brown |
| 2005/0276831 A1 | 12/2005 | Dihora et al. |
| 2006/0019847 A1 | 1/2006 | Fan et al. |
| 2006/0019858 A1 | 1/2006 | Kruse et al. |
| 2006/0024353 A1 | 2/2006 | Trouve et al. |
| 2006/0029561 A1 | 2/2006 | Gunn et al. |
| 2006/0106186 A1 | 5/2006 | Dupont et al. |

(56) References Cited

U.S. PATENT DOCUMENTS

| | | |
|---|---|---|
| 2006/0111511 A1 | 5/2006 | Narayan et al. |
| 2006/0182917 A1 | 8/2006 | Wood et al. |
| 2006/0183203 A1 | 8/2006 | DeAngelis |
| 2006/0183856 A1 | 8/2006 | Wood et al. |
| 2006/0183857 A1 | 8/2006 | Wood et al. |
| 2006/0252901 A1 | 11/2006 | Narayan et al. |
| 2006/0258555 A1 | 11/2006 | Filippini et al. |
| 2006/0258557 A1 | 11/2006 | Popplewell et al. |
| 2006/0281654 A1 | 12/2006 | Brooker et al. |
| 2007/0015678 A1 | 1/2007 | Rodrigues et al. |
| 2007/0021577 A1 | 1/2007 | Rodrigues et al. |
| 2007/0054816 A1 | 3/2007 | Berthier et al. |
| 2007/0056900 A1 | 3/2007 | Mathauer et al. |
| 2007/0111920 A1 | 5/2007 | Baur et al. |
| 2007/0138105 A1 | 6/2007 | Takeda et al. |
| 2007/0260046 A1 | 11/2007 | Tomita et al. |
| 2008/0020961 A1 | 1/2008 | Rodrigues et al. |
| 2008/0021167 A1 | 1/2008 | Rodrigues |
| 2008/0021168 A1 | 1/2008 | Rodrigues et al. |
| 2008/0118568 A1 | 5/2008 | Smets et al. |
| 2008/0139441 A1 | 6/2008 | Xiao et al. |
| 2008/0146478 A1 | 6/2008 | Lei et al. |
| 2008/0230193 A1 | 9/2008 | Mori et al. |
| 2008/0274940 A1 | 11/2008 | Tjelta et al. |
| 2008/0274942 A1 | 11/2008 | Tjelta et al. |
| 2008/0277620 A1 | 11/2008 | Kesavan et al. |
| 2008/0305982 A1 | 12/2008 | Smets et al. |
| 2008/0311064 A1 | 12/2008 | Lei et al. |
| 2009/0011214 A1 | 1/2009 | Wang |
| 2009/0011973 A1 | 1/2009 | Besse et al. |
| 2009/0023625 A1 | 1/2009 | Tang et al. |
| 2009/0062175 A1 | 3/2009 | Cermenati et al. |
| 2009/0087390 A1 | 4/2009 | Modi |
| 2009/0176687 A1 | 7/2009 | Tjelta et al. |
| 2009/0258042 A1 | 10/2009 | Anastasiou et al. |
| 2009/0258810 A1 | 10/2009 | Song et al. |
| 2009/0326165 A1 | 12/2009 | Patil et al. |
| 2010/0008870 A1 | 1/2010 | Dihora et al. |
| 2010/0056413 A1 | 3/2010 | Harry, Jr. et al. |
| 2010/0069280 A1 | 3/2010 | Rodrigues et al. |
| 2010/0075879 A1 | 3/2010 | Gizaw et al. |
| 2010/0075880 A1 | 3/2010 | Dupont et al. |
| 2010/0075887 A1 | 3/2010 | Wang et al. |
| 2010/0086575 A1 | 4/2010 | Dihora et al. |
| 2010/0093584 A1 | 4/2010 | Brand et al. |
| 2010/0154831 A1 | 6/2010 | Neplenbroek et al. |
| 2010/0167547 A1 | 7/2010 | Kamimura |
| 2010/0236736 A1 | 9/2010 | Brockmeyer et al. |
| 2010/0280146 A1 | 11/2010 | Vanderlaan et al. |
| 2010/0317560 A1 | 12/2010 | Ryther et al. |
| 2011/0017945 A1 | 1/2011 | Miralles et al. |
| 2011/0021410 A1 | 1/2011 | Miralles et al. |
| 2011/0028371 A1 | 2/2011 | Rodrigues et al. |
| 2011/0034622 A1 | 2/2011 | Kawamura et al. |
| 2011/0118168 A1 | 5/2011 | Schunicht et al. |
| 2011/0136718 A1 | 6/2011 | Rodrigues et al. |
| 2012/0134942 A1 | 5/2012 | Thomaides et al. |
| 2013/0035273 A1 | 2/2013 | Silvernail et al. |
| 2013/0035274 A1 | 2/2013 | Silvernail et al. |
| 2013/0035275 A1 | 2/2013 | Silvernail et al. |
| 2013/0035276 A1 | 2/2013 | Silvernail et al. |
| 2013/0035277 A1 | 2/2013 | Silvernail et al. |

FOREIGN PATENT DOCUMENTS

| | | |
|---|---|---|
| CN | 101830015 A | 9/2010 |
| CN | 101863540 A | 10/2010 |
| CN | 102146150 A | 8/2011 |
| DE | 40 38 908 A1 | 6/1992 |
| EP | 0 130 756 A1 | 1/1985 |
| EP | 0 404 377 A1 | 12/1990 |
| EP | 0 405 917 A1 | 1/1991 |
| EP | 0 438 215 A1 | 7/1991 |
| EP | 0441 197 A2 | 8/1991 |
| EP | 0 526 800 A1 | 2/1993 |
| EP | 0 577 519 A1 | 1/1994 |
| EP | 0628655 B1 | 6/1994 |
| EP | 0 605 084 A1 | 7/1994 |
| EP | 0505371 B1 | 3/1996 |
| EP | 0 725 131 A1 | 8/1996 |
| EP | 0725131 B1 | 8/1996 |
| EP | 0 869 169 A1 | 10/1998 |
| EP | 0653485 B1 | 5/2000 |
| EP | 1043388 B1 | 10/2000 |
| EP | 1043389 B1 | 10/2000 |
| EP | 0703243 B1 | 12/2000 |
| EP | 1021156 B1 | 2/2002 |
| EP | 1 007 529 B1 | 5/2002 |
| EP | 1 236 748 A1 | 9/2002 |
| EP | 1506765 B1 | 2/2005 |
| EP | 1 022 294 B1 | 6/2005 |
| EP | 1162257 B1 | 2/2006 |
| EP | 1520004 B1 | 12/2006 |
| EP | 1997874 A1 | 3/2008 |
| EP | 1 950 232 A1 | 7/2008 |
| EP | 1699429 B1 | 10/2008 |
| EP | 2014757 A1 | 1/2009 |
| EP | 1741775 B1 | 4/2009 |
| EP | 2 072 531 A1 | 6/2009 |
| EP | 2 138 560 B1 | 12/2009 |
| EP | 1877171 B1 | 3/2010 |
| FR | 2856073 A1 | 12/2004 |
| FR | 2 908 135 A1 | 5/2008 |
| FR | 2 927 083 A1 | 8/2009 |
| GB | 1137741 | 12/1968 |
| GB | 1322536 A | 7/1973 |
| GB | 1355998 A | 6/1974 |
| GB | 1464616 A | 2/1977 |
| GB | 2322137 A | 8/1998 |
| GB | 2432844 A | 6/2007 |
| GB | 2432852 A | 6/2007 |
| JP | 57-082145 | 5/1982 |
| JP | 6157253 | 6/1994 |
| JP | 6-298866 | 10/1994 |
| JP | 6298866 | 10/1994 |
| JP | 6-315622 | 11/1994 |
| JP | 9249892 | 9/1997 |
| JP | 11-343449 | 12/1999 |
| JP | 2000017299 | 1/2000 |
| JP | 2002-526611 | 8/2002 |
| JP | 2002285019 | 10/2002 |
| JP | 2004-107233 | 4/2004 |
| JP | 2005-120045 | 5/2005 |
| JP | 2005-532304 | 10/2005 |
| JP | 2008208051 | 9/2008 |
| JP | 2010-47713 | 3/2010 |
| JP | 2011-195809 | 10/2011 |
| WO | WO 91/06637 | 5/1991 |
| WO | WO 92/06162 | 4/1992 |
| WO | WO 92/10433 | 6/1992 |
| WO | WO 93/02118 | 2/1993 |
| WO | WO 93/11214 | 6/1993 |
| WO | WO 93/11214 A1 | 6/1993 |
| WO | WO 93/19038 | 9/1993 |
| WO | WO 93/19146 | 9/1993 |
| WO | WO 94/09099 | 4/1994 |
| WO | WO 95/10591 | 4/1995 |
| WO | WO 95/26393 | 10/1995 |
| WO | WO 95/26710 A1 | 10/1995 |
| WO | WO 96/35645 A1 | 11/1996 |
| WO | WO 96/37530 A1 | 11/1996 |
| WO | WO 97/45510 A1 | 12/1997 |
| WO | WO 98/18352 A1 | 5/1998 |
| WO | WO 98/35002 | 8/1998 |
| WO | WO 98/35003 | 8/1998 |
| WO | WO 98/35004 | 8/1998 |
| WO | WO 98/35005 | 8/1998 |
| WO | WO 98/35006 | 8/1998 |
| WO | WO 98/49260 A1 | 11/1998 |
| WO | WO 99/02663 | 1/1999 |
| WO | WO 99/05082 | 2/1999 |
| WO | WO 99/05084 | 2/1999 |
| WO | WO 99/05241 | 2/1999 |

(56) References Cited

FOREIGN PATENT DOCUMENTS

| WO | WO 99/05242 | 2/1999 |
|---|---|---|
| WO | WO 99/05243 | 2/1999 |
| WO | WO 99/05244 | 2/1999 |
| WO | WO 99/07656 | 2/1999 |
| WO | WO 99/20726 | 4/1999 |
| WO | WO 99/27083 | 6/1999 |
| WO | WO 99/36470 A1 | 7/1999 |
| WO | WO 00/12661 A1 | 3/2000 |
| WO | WO 00/15180 A1 | 3/2000 |
| WO | WO 00/18868 A1 | 4/2000 |
| WO | WO 00/20470 | 4/2000 |
| WO | WO 00/23548 | 4/2000 |
| WO | WO 0023549 | 4/2000 |
| WO | WO 00/36076 A1 | 6/2000 |
| WO | WO 00/47708 | 8/2000 |
| WO | WO 01/24779 A1 | 4/2001 |
| WO | WO 01/32816 A1 | 5/2001 |
| WO | WO 01/42408 A2 | 6/2001 |
| WO | WO 02/38715 A2 | 5/2002 |
| WO | WO 02/44686 A2 | 6/2002 |
| WO | WO 03/042262 A2 | 5/2003 |
| WO | WO 03/095597 A1 | 11/2003 |
| WO | WO 2004/046301 A1 | 6/2004 |
| WO | WO 2004/048418 A2 | 6/2004 |
| WO | WO 2005/012378 A1 | 2/2005 |
| WO | WO 2005/051343 A1 | 6/2005 |
| WO | WO2005/059023 | 6/2005 |
| WO | WO 2005/068552 A1 | 7/2005 |
| WO | WO 2006/002565 A1 | 1/2006 |
| WO | WO 2006/007945 A1 | 1/2006 |
| WO | WO 2006/026406 A2 | 3/2006 |
| WO | WO 2006/119162 A1 | 11/2006 |
| WO | WO 2007/140267 A1 | 12/2007 |
| WO | WO 2008/089262 A1 | 7/2008 |
| WO | WO 2008/144744 A2 | 11/2008 |
| WO | WO 2008/147940 A2 | 12/2008 |
| WO | WO 2009/006603 A1 | 1/2009 |
| WO | WO 2009/087525 A1 | 7/2009 |
| WO | WO 2009/156233 A1 | 12/2009 |
| WO | WO 2010/057977 A1 | 5/2010 |
| WO | WO 2010/065482 A1 | 6/2010 |
| WO | WO 2010/065483 A1 | 6/2010 |
| WO | WO 2010/079466 A2 | 7/2010 |
| WO | WO 2010/079467 A2 | 7/2010 |
| WO | WO 2010/144575 A1 | 12/2010 |
| WO | WO 2011/008272 A1 | 1/2011 |
| WO | WO 2011/014783 A1 | 2/2011 |
| WO | WO 2011/017223 A1 | 2/2011 |
| WO | WO 2011/025624 A1 | 3/2011 |
| WO | WO 2011/044490 A1 | 4/2011 |
| WO | WO 2011/135313 A1 | 11/2011 |
| WO | WO 2012/000609 A1 | 1/2012 |

OTHER PUBLICATIONS

Chinese Office Action Action mailed Jul. 1, 2010 for Patent Application No. 200710169190.X.
English QPatent Abstract for European Patent Publication No. 0 577 519 A1.
English Abstract for Japanese Patent Publication No. JP 2005/120045 (Abstract No. 2005-359217/37).
European Application No. 070144313.4, Office Action mailed Dec. 15, 2009.
Chinese Application No. 200710169189.7, Office Action mailed Jun. 9, 2010.
International Search Report for PCT Application No. US2010/043919; Completed Sep. 22, 2010.
Questel QPatents Abstract for Japanese Patent Publication 11-343449.
European Search Report for Application No. 11158599.8; Completion Date Aug. 11, 2011.
International Search Report and Written Opinion for Application No. PCTEP2011/073928; Completion Date Jan. 18, 2012.
English Abstract of Chinese Publication No. CN 101830015 A.
English Abstract of Chinese Publication No. CN 101863540 A.
English Abstract of Chinese Publication No. CN 102146150 A.
English Translation of European Publication No. EP 0 725 131 A1.
English Translation of European Publication No. EP 2 072 531 A1.
English Translation of French Publication No. FR 2 908 135 A1.
English Translation of French Publication No. FR 2 927 083 A1.
English Abstract of Japanese Publication No. JP 6-298866 A.
English Abstract of Japanese Publication No. JP 2010-47713 A.
English Abstract of Japanese Publication No. JP 2011-195809 A.
European Search Report for Application No. 12154675.8; Completion Date May 14, 2012.
European Search Report for Application No. 12154684.0; Completion Date May 14, 2012.
English Abstract for Japanese Patent Publication No. JP 57-082145.
English Translation of Japanese Office Action mailed Jun. 5, 2012.
English Translation of Japanese Office Action mailed Sep. 25, 2012.
International Search Report for Application No. PCT/EP2012/071741; Completion Date Nov. 14, 2012.
International Search Report for Application No. PCT/EP2012/071742; Completion Date Nov. 14, 2012.
Pal, S., et al., "Cationic starch: an effective flocculating agent," Carbohydrate Polymers, 2005, 59, pp. 417-423.
International Search Report issued in PCT/US2012/049514 mailed Feb. 19, 2013, 3 pages.
International Search Report and Written Opinion issued in PCT/US2012/049595, mailed Feb. 25, 2013, 10 pages.
International Search Report and Written Opinion issued in International Application No. PCT/US2012/049547, mailed Jan. 23, 2013, 11 pages.
International Search Report and Written Opinion issued in PCT/US2012/049564, mailed Jan. 23, 2013, 10 pages.
International Search Report and Written Opinion issued in PCT/US2012/049584, mailed Jan. 21, 2013, 11 pages.
Athawale et al., "Graft Polymerization: Starch as a Model Substrate", J.M.S. Rev. Macromol. CHem. Phys., C39(3), 445-480, 1999.
Willett et al., "Initiator Effects in Reactive Extrusion of Starch-Polyacrylamide Graft Copolymers," Wiley InterScience, Received May 28, 2004; Accepted Feb. 22, 2005, pp. 52-58.
Water Purification handbook, Chapter 25, Deposit and Scale Control-Cooling System, retrieved from: http://www.gewater.com/handbook/cooling_water_system.ch_25_deposit.jsp.
English Abstract for European Publication No. 0628655 A1.
English Abstract for European Publication No. 0725131 A1.
English Abstract for Japanese Publication No. 2008208051 A1.
English Abstract for Japanese Publication No. 6157253 A1.
English Abstract for Japanese Publication No. 6298866 A1.
English Abstract for Japanese Publication No. 9249892 A1.
English Translation for European Publication No. 1021156 A1.
English Abstract for European Publication No. 1043388 A1.
English Abstract for European Publication No. 1043389 A1.
English Abstract for European Publication No. 1506765 A1.
English Abstract for European Publication No. 1520004 A1.
English Abstract for European Publication No. 1699429 A1.
English Translation for European Publication No. 1877171 A1.
English Abstract for French Publication No. 2856073 A1.
English Abstract for Japanese Publication No. 2000017299 A1.
English Abstract for Japanese Publication No. 2002285019 A1.
English Translation of Japanese Office Action mailed Oct. 22, 2013 for Application No. 2012-523097.
English Abstract of Japense Publication No. 2004-107233.

SULFONATED GRAFT COPOLYMERS

CROSS REFERENCE TO RELATED APPLICATIONS

The present application is a continuation-in-part of U.S. Ser. No. 11/459,225, filed 21 Jul. 2006 now abandoned.

The present invention relates to graft copolymers formed from both synthetic and naturally derived materials. More particularly, the present invention is directed towards sulfonated graft copolymers formed from synthetic sulfonate moieties grafted onto saccharides and polysaccharides.

Graft copolymers produced by grafting sulfonate groups onto sugars such as mono- and disaccharides are known in the art. According to one technique, these polymers are made using mercaptan chain transfer agents. However, the mercaptans tend to stop growing chains and start new chains, producing ungrafted synthetic homopolymers. Performance from these materials is mainly due to the synthetic homopolymers, as exemplified by the relatively low amounts of saccharides (40 wt % or less). Higher amounts of sugar result in phase separation. Secondly, the functionality of these materials (e.g., calcium binding) tends to be inversely proportional to the amount of saccharide constituent (i.e., the greater the weight percent of saccharide, the lower the functionality). This characteristic indicates that the material is mostly synthetic copolymer and saccharide, with little to no grafting. Therefore, the saccharide contribution to properties such as calcium binding is, at best, negligible. When higher molecular weight polysaccharides such as maltodextrins have been used, precipitants form indicating that there is little or no grafting, with the resultant synthetic polymer phase separating from the polysaccharide.

Therefore, there is a need for sulfonated graft copolymers with low levels of synthetic homopolymers. By reducing the level of synthetic homopolymers, the level of unreacted sugars (which act as a diluent) is reduced. By successfully grafting onto the sugar, the natural part of the copolymer is utilized, resulting in better performance.

Additionally, there is a need for sulfonated graft copolymers with a large weight percent (greater than 50 or 60 wt %) of the saccharide component. Such copolymers provide low cost materials, minimize the amount of synthetic monomers derived from petroleum resources, improve biodegradability and provide a renewable raw material source.

The present invention is directed towards sulfonated graft copolymers that perform as well as wholly synthetic polymers in dispersancy and scale inhibition applications in aqueous treatment systems. Additionally, the present invention is directed towards graft copolymers having a high degree of natural component. Copolymers according to the present invention have performance properties similar to synthetic polymers (e.g., scale minimization, such as calcium phosphate scale) but cost less, are readily available, and are environmentally friendly materials derived from renewable sources. These copolymers have application in water treatment, detergent, oil field and other dispersant applications.

The present invention also provides for processes for making sulfonated graft copolymers using polysaccharides having molecular weights that are higher than mono- and disaccharides.

Accordingly, the present invention is directed towards sulfonated graft copolymer obtained by radical graft copolymerization of one or more synthetic monomers in the presence of hydroxyl-containing naturally derived materials that are (a) monosaccharides or disaccharides or (b) oligosaccharides, polysaccharides or small natural molecules. The copolymers include from about 0.1 to 100 wt %, based on total weight of the synthetic monomers, of at least one monoethylenically unsaturated monomer having a sulfonic acid group, monoethylenically unsaturated sulfuric acid ester or salt thereof. When the hydroxyl-containing naturally derived materials are monosaccharides or disaccharides, the hydroxyl-containing naturally derived materials are present in an amount of at least 60% by weight based on total weight of the copolymer. When the hydroxyl-containing naturally derived materials are oligosaccharides, polysaccharides or small natural molecules, the hydroxyl-containing naturally derived materials are present in an amount of at least about 5% by weight based on total weight of the copolymer.

In one aspect, the sulfonated graft copolymers are such that the one or more synthetic monomers and hydroxyl-containing naturally derived materials are present in a weight ratio of about 50:50 to 10:90, respectively. In another aspect, the one or more synthetic monomers and hydroxyl-containing naturally derived materials are present in a weight ratio of about 60:40 to 95:5, respectively.

In one aspect, sulfonated graft copolymers according to the present invention also optionally include about 5 to 95 wt %, based on total weight of the one or more synthetic monomers, of at least one monoethylenically unsaturated $C_3$-$C_{10}$ carboxylic acid, or salt thereof.

In one aspect, sulfonated graft copolymers according to the present invention also optionally include about 0.1 to 50 wt %, based on total weight of the one or more synthetic monomers, of at least one ethylenically unsaturated $C_4$-$C_{10}$ dicarboxylic acid, or salt thereof.

In one aspect, sulfonated graft copolymers according to the present invention also optionally include one or more monomers having a nonionic, hydrophobic and/or carboxylic acid group, wherein the one or more monomers are incorporated into the copolymer in an amount of about 10 wt % or less based on total weight of the graft copolymer.

In one aspect, the hydroxyl-containing naturally derived material of the sulfonated graft copolymer is water soluble. In another aspect, the hydroxyl-containing naturally derived material of the sulfonated graft copolymer is a maltodextrin.

Examples of sulfonic acid monomer suitable for use in sulfonated graft copolymers according to the present invention include 2-acrylamido-2-methyl propane sulfonic acid, vinyl sulfonic acid, sodium (meth)allyl sulfonate, sulfonated styrene, (meth)allyloxybenzene sulfonic acid, sodium 1-allyloxy 2 hydroxy propyl sulfonate and combinations thereof. In another aspect, the sulfonic acid monomer is 2-acrylamido-2-methyl propane sulfonic acid or sodium (meth)allyl sulfonate. In even another aspect, the sulfonic acid monomer is 2-acrylamido-2-methyl propane sulfonic acid.

The weight percent of the natural component in sulfonated graft copolymer according to the present invention can be about 20 wt % or greater.

Sulfonated graft copolymers according to the present invention are suitable for use in cleaning compositions. Such cleaning compositions can include one or more adjuvants. In one aspect, the copolymer is present in the cleaning composition in an amount of from about 0.01 to about 10 weight %. In one aspect, the cleaning composition is a detergent composition. The detergent composition can be a powdered detergent composition or an autodish composition. Detergent compositions include zero phosphate detergent compositions.

The present invention provides a method of reducing spotting and/or filming in the rinse cycle of an automatic dishwasher by adding to the rinse cycle a rinse aid composition comprising the sulfonated graft copolymer according to the invention. The present invention also provides for a method of improving sequestration, threshold inhibition and soil removal in a cleaning composition by adding the sulfonated graft copolymer according to the invention to the cleaning composition.

In one embodiment, the present invention is directed towards water treatment systems comprising sulfonated graft copolymers according to the present invention, wherein the graft copolymer is present in the system in an amount of at least about 0.5 mg/L.

In one embodiment, the present invention provides a method of dispersing and/or minimizing scale in a water treatment or oilfield system by adding the sulfonated graft copolymer according to the present invention to the water treatment or oilfield system. In another embodiment, the present invention provides a method of dispersing pigments and/or minerals in a solution by adding the sulfonated graft copolymer according to the present invention to a dispersant composition. Minerals that can be dispersed include, for example, titanium dioxide, kaolin clays, modified kaolin clays, calcium carbonates and synthetic calcium carbonates, iron oxides, carbon black, talc, mica, silica, silicates, and aluminum oxide. The present invention also provides a method of dispersing soils and dirt in cleaning and water treatment applications by adding a dispersant composition comprising the sulfonated graft copolymer according to the present invention to cleaning system or water treatment system.

Dispersant composition according to the present invention can be added to, for example, paints, coatings, plastics, rubbers, filtration products, cosmetics, cement and concrete and/or food and/or paper coatings.

The present invention is further directed towards fiberglass binders comprising sulfonated graft copolymers according to the present invention, wherein the graft copolymer is present in the system from about 0.1 to 50 weight percent of the binder.

The present invention also provides for a method of reducing scale in oilfields by adding the sulfonated graft copolymer according to the present invention to an oilfield treatment composition, wherein the oilfield treatment composition is used in cementing and drilling mud applications.

In one embodiment, the present invention is directed towards a sulfonated graft copolymer having a synthetic component formed from at least one olefinically unsaturated sulfonic acid monomer and/or salts thereof and a natural component formed from a hydroxyl-containing natural moiety, wherein the weight percent of natural component in the graft copolymer is about 5 wt % or greater based on total weight of the graft copolymer.

In one embodiment, the present invention is directed towards a cement composition for oil field systems comprising sulfonated graft copolymers according to the present invention, cement, and water.

In one embodiment, the present invention is directed towards a drilling fluid composition for oil field systems comprising sulfonated graft copolymers according to the present invention, drilling mud and water.

In one embodiment, the present invention is directed towards a spacer composition for oil field systems comprising sulfonated graft copolymers according to the present invention, one or more surfactants, and water. The spacer composition can further include viscosifiers and/or weighting materials.

In one embodiment, the present invention is directed towards a scale inhibition composition for water treatment and oil field systems comprising sulfonated graft copolymers according to the present invention, wherein the hydroxyl-containing natural moiety is a polysaccharide. Such scale inhibition compositions can be used to inhibit calcium carbonate, halite, calcium sulfate, barium sulfate, strontium sulfate, iron sulfide, lead sulfide, zinc sulfide or mixtures thereof.

In one embodiment, the present invention is directed towards a biodegradable dispersant composition for water treatment and oil field systems comprising sulfonated graft copolymers according to the present invention. Such biodegradable dispersant compositions can include glycerol, monosaccharide, disaccharide, oligosaccharide, polysaccharide or mixtures thereof as the chain terminating portion of the graft copolymer in an amount of about 20 percent or greater by weight, based on total weight of the copolymer. In another aspect, the biodegradable dispersant composition comprises glycerol, monosaccharide, disaccharide, oligosaccharide, polysaccharide or mixtures thereof as the chain terminating portion of the copolymer in an amount of about 60 percent or greater by weight, based on total weight of the copolymer.

In one embodiment, the present invention is directed towards a brine compatible polymer for oil field systems comprising sulfonated graft copolymers according to the present invention. In one aspect, the sulfonated graft copolymer of the brine compatible polymer is soluble at a dose of at least about 5 ppm in brine containing at least about 35 grams per liter of salt. In one embodiment the hydroxyl-containing natural moiety of the sulfonated graft copolymer in the brine compatible polymer includes at least about 20 percent by weight of glycerol, monosaccharide, disaccharide, oligosaccharide, polysaccharide or mixtures thereof.

The present invention is further directed towards a method of cementing a subterranean zone penetrated by a well bore. The method includes preparing a cement composition comprising hydraulic cement, sufficient water to form a slurry and the graft copolymer according to the present invention; placing said cement composition in said subterranean zone; and allowing said cement composition to set therein.

In another embodiment, the present invention is directed towards a method of controlling scale in aqueous systems. The method includes adding to an aqueous system sulfonated graft copolymers according to the present invention, wherein the hydroxyl containing natural moiety of the sulfonated graft copolymer is a polysaccharide. Scale inhibited by such method includes, for example, calcium carbonate, halite, calcium phosphate, calcium sulfate, barium sulfate, strontium sulfate, iron sulfide, lead sulfide, zinc sulfide or mixtures thereof. In one aspect, the aqueous system can be found in an oil field. In one aspect, the sulfonated graft copolymer is injected into an oil-bearing rock formation matrix. In another aspect, the sulfonated graft copolymer is added topside to production water. The production water can then be reinjected into the oil-bearing rock formation matrix. In even another aspect, the sulfonated graft polymer can be introduced to the aqueous system in a carrier fluid. An example of such a carrier fluid is methanol.

The present invention further provides a method for displacing drilling fluid from a wellbore space occupied by the drilling fluid. In this manner, the drilling fluid is displaced with a spacer fluid having water and sulfonated graft polymers according to the present invention. At least a portion of the spacer fluid can then be displaced with a settable cement composition. In one aspect, the spacer fluid can include from about 1 to about 10 pounds of dispersant per barrel of spacer fluid. The spacer fluid can also include a cementitious material; and/or a viscosifier such as welan gum, xanthan gum, hydroxyethyl cellulose, carboxymethyl hydroxyethyl cellulose, attapulgite, partially hydrolyzed polyacrylamide; sepiolite, bentonite, acrylamide, acrylic acid, 2-acrylamido-2-methylpropane sulfonic acid copolymers, polyvinyl pyrrolidone, and silicate extenders. Examples of cementitious material include lime, silica and alumina, lime and magnesia, silica and alumina and iron oxide, calcium sulfate, Portland cement, ground slag, fly ash and mixtures thereof. In another aspect the spacer fluid can also include at least one cement property modifier chosen from nonionic water wetting surfactants, anionic water wetting surfactants, retarders, dispersants, densifiers, fluid loss additives, and silica flour. In another aspect the spacer fluid can include a weighting material such as barite, hematite, illmenite, calcium carbonate and sand. In even another aspect the spacer fluid can include at least an anionic surfactant and/or at least one nonionic surfactant.

In another embodiment the present invention provides a method of carrying out oil well drilling operations by circulating a drilling fluid in a well being drilled in the ground, wherein the drilling fluid includes clay and sulfonated graft copolymers according to the present invention.

Sulfonated graft copolymers according to the present invention are produced by grafting synthetic sulfonated monomers onto hydroxyl-containing naturally derived materials. Use of natural materials to produce a sulfonated graft copolymer is an attractive and readily available substitute for current synthetic materials. Such substitute natural materials include, for example, organic acids and small molecule natural alcohols like glycerol, which are by-products of biodiesel production. Glycerol is also a by-product of oils and fats used in the manufacture of soaps and fatty acids, and can be produced by fermentation of sugar. In one aspect of the present invention, the small molecule natural alcohol is glycerol. Organic acids include, for example, citric acid, which is produced industrially by mold fermentation of carbohydrates from lemon, lime, pineapple juice, molasses, etc. Another organic acid, lactic acid, is produced commercially by fermentation of milk whey, starch, potatoes, molasses, etc. Tartaric acid is one naturally occurring byproduct of the wine making process.

As noted above, these hydroxyl-containing naturally derived materials include small molecule natural alcohols such as glycerol, citric acid, lactic acid, tartaric acid, gluconic acid, glucoheptonic acid, monosaccharides and disaccharides such as sugars. In another aspect, they include larger molecules such as oligosaccharides and polysaccharides (e.g., maltodextrins and starches). Examples of these monosaccharides and disaccharides include sucrose, fructose, maltose, glucose, saccharose and others. For the purpose of the present invention, oligosaccharides are defined as having an average of 3 to about 10 anhydroglucose repeat units per molecule. In like manner, polysaccharides, for the purpose of the present invention, are defined as having more than about 10 anhydroglucose repeat units per molecule.

In one aspect the natural component of the sulfonated graft copolymer is glycerol citric acid, maltodextrins, sucrose and maltose. In a further aspect, maltodextrins are used as the polysaccharide and sucrose and maltose are used as the monosaccharides.

Polysaccharides useful in the present invention can be derived from plant, animal and microbial sources. Examples of such polysaccharide sources include starch, cellulose, gums (e.g., gum arabic, guar and xanthan), alginates, pectin and gellan. Starches include those derived from maize and conventional hybrids of maize, such as waxy maize and high amylose (i.e., greater than 40% amylose) maize, as well as other starches such as potato, tapioca, wheat, rice, pea, sago, oat, barley, rye, and amaranth, including conventional hybrids or genetically engineered materials. Also included are hemicellulose or plant cell wall polysaccharides such as D-xylans. Examples of plant cell wall polysaccharides include arabino-xylans such as corn fiber gum, a component of corn fiber.

Useful polysaccharides should be water soluble during grafting. This implies that the polysaccharides either have a molecular weight low enough to be water soluble, or can be hydrolyzed in situ during the reaction to become water soluble. For example, non-degraded starches are not water soluble. However, degraded starches are water soluble and can be used.

Hydroxyl-containing natural materials (monosaccharides, oligosaccharides and polysaccharides) can be degraded oxidatively, hydrolytically or enzymatically. Generally speaking, degraded polysaccharides according to the present invention can have a number average molecular weight (Mn) of about 100,000 or less. In one aspect, the number average molecular weight of the sulfonated graft copolymer is about 25,000 or less. In another aspect, the degraded polysaccharides have a number average molecular weight of about 10,000 or less.

These monosaccharides, oligosaccharides and polysaccharides can optionally be chemically modified. Chemically modified derivatives include carboxylates, sulfonates, phosphates, phosphonates, aldehydes, silanes, alkyl glycosides, alkyl-hydroxyalkyls, carboxy-alkyl ethers and other derivatives. The polysaccharide can be chemically modified before, during or after the grafting reaction.

Oligosaccharides useful in the present invention include corn syrups. Corn syrups are defined as degraded starch products having a DE of 27 to 95. Examples of specialty corn syrups include high fructose corn syrup and high maltose corn syrup. Monosaccharides and disaccharides such as galactose, mannose, sucrose, maltose, ribose, trehalose and lactose can also be used.

Other polysaccharides useful in this invention include maltodextrins, which are polymers having D-glucose units linked primarily by α-1,4 bonds and a dextrose equivalent ('DE') of less than about 20. Dextrose equivalent is a measure of the extent of starch hydrolysis. It is determined by measuring the amount of reducing sugars in a sample relative to dextrose (glucose). The DE of dextrose is 100, representing 100% hydrolysis. The DE value gives the extent of hydrolysis (e.g., 10 DE is more hydrolyzed than 5 DE maltodextrin). Maltodextrins are available as a white powder or concentrated solution and are prepared by the partial hydrolysis of starch with acid and/or enzymes. Maltodextrins typically have a distribution of chain lengths, depending upon the number of anhydrous glucose repeat units. The number of repeat units can vary from 1 to greater than 10. (For example, a DE of about 20 would have approximately 5 repeat units, a DE of 100 is equivalent to about 1 repeat unit, and a DE of 1 is equivalent to about 100 repeat units.) In maltodextrins, the larger weight fraction of a sample has greater than 10 anhydroglucose repeat units. Therefore, by convention maltodextrins are considered to be a polysaccharide, even though they may have components that fall under the oligosaccharide definition.

Polysaccharides useful in the present invention further include pyrodextrins. Pyrodextrins are made by heating acidified, commercially dry starch to a high temperature. Extensive degradation occurs initially due to the usual moisture present in starch. However, unlike the above reactions that are done in aqueous solution, pyrodextrins are formed by heating powders. As moisture is driven off by the heating, hydrolysis stops and recombination of hydrolyzed starch fragments occur. This recombination reaction makes these materials distinct from maltodextrins, which are hydrolyzed starch fragments. The resulting pyrodextrin product also has much lower reducing sugar content, as well as color and a distinct odor.

Polysaccharides can be modified or derivatized by etherification (e.g., via treatment with propylene oxide, ethylene oxide, 2,3-epoxypropyl trimethyl ammonium chloride), esterification (e.g., via reaction with acetic anhydride, octenyl succinic anhydride ('OSA')), acid hydrolysis, dextrinization, oxidation or enzyme treatment (e.g., starch modified with α-amylase, β-amylase, pullanase, isoamylase or glucoamylase), or various combinations of these treatments. These treatments can be performed before or after the graft copolymerization process.

The natural component can range in weight from 10 to 90 weight percent of the total weight of the copolymer. In one embodiment, the natural component ranges from 20 to 70 percent by weight of total weight of copolymer. In another embodiment, the natural component ranges from 20 to 50 percent by weight of total weight of copolymer.

Any polymerizable monomer which contains a sulfonate group can be used to produce sulfonated graft copolymers according to the present invention. Sulfonated monomers include but are not limited to 2-acrylamido-2-methyl propane sulfonic acid ('AMPS'), vinyl sulfonic acid, sodium (meth) allyl sulfonate, sulfonated styrene, (meth)allyloxybenzene sulfonic acid, sodium 1-allyloxy 2 hydroxy propyl sulfonate, and combinations thereof.

The sulfonated monomer can be from about 2 up to 100 percent by weight of the total synthetic monomer weight of the copolymer. In one embodiment, the sulfonated monomer is about 5 to 95 percent by weight of the total synthetic monomer weight of the copolymer. In another embodiment, the sulfonated monomer is about 5 to 50 percent by weight of the total synthetic monomer weight of the copolymer, In even another embodiment, the sulfonated monomer is about 10 to about 25 percent by weight of the total synthetic monomer weight of the copolymer.

Other polymerizable monomers can be added in addition to the sulfonated monomer when producing the sulfonated graft copolymers of this invention. These optional monomers can include, for example, monomers with a non-ionic, hydrophobic or carboxylic acid group. Monomers with a carboxylic acid group are preferred for economic reasons.

Optional carboxylic acid monomers include, for example, monoethylenically unsaturated $C_3$-$C_{10}$ carboxylic acids. Examples of such carboxylic acid monomers include but are not limited to acrylic acid, methacrylic acid, ethacrylic acid, α-chloro-acrylic acid, α-cyano acrylic acid, β-methyl-acrylic acid (crotonic acid), α-phenyl acrylic acid, β-acryloxy propionic acid, sorbic acid, α-chloro sorbic acid, angelic acid, cinnamic acid, p-chloro cinnamic acid, β-styryl acrylic acid (1-carboxy-4-phenyl butadiene-1,3), and others. The alkali, alkaline earth metal or ammonium salts of these acids can also be used. In one embodiment, monoethylenically unsaturated $C_3$-$C_{10}$ carboxylic acids comprise from about 5 to 95 weight % of the total weight percent of the synthetic monomer constituency of the graft copolymer.

Optional carboxylic acid monomers also include monoethylenically unsaturated $C_4$-$C_{10}$ dicarboxylic acids, the alkali or alkaline earth metal or ammonium salts thereof, and the anhydrides thereof. Examples of such carboxylic acid monomers include but are not limited to itaconic acid, maleic acid, citraconic acid, mesaconic acid, glutaconic acid, aconitic acid, fumaric acid, tricarboxy ethylene, and others. Moieties such as maleic anhydride or acrylamide that can be derivatized to an acid-containing group can also be used. The alkali, alkaline earth metal or ammonium salts of these acids can also be used. In one embodiment, monoethylenically unsaturated $C_4$-$C_{10}$ dicarboxylic acids comprise up to about 40 weight % of the total weight percent of the synthetic monomer constituency of the graft copolymer.

In one aspect the carboxylic acid monomer is acrylic acid, methacrylic acid, or mixtures thereof. In another aspect the carboxylic acid monomer is acrylic acid.

Examples of optional hydrophobic monomers include saturated or unsaturated alkyl, hydroxyalkyl, alkylalkoxy groups, arylalkoxy, alkarylalkoxy, aryl and aryl-alkyl groups, siloxane and combinations thereof. Examples of hydrophobic monomers also include styrene, α-methyl styrene, methyl methacrylate, methyl acrylate, 2-ethylhexyl acrylate, octyl acrylate, lauryl acrylate, stearyl acrylate, behenyl acrylate, 2-ethylhexyl methacrylate, octyl methacrylate, lauryl methacrylate, stearyl methacrylate, behenyl methacrylate, 2-ethylhexyl acrylamide, octyl acrylamide, lauryl acrylamide, stearyl acrylamide, behenyl acrylamide, propyl acrylate, butyl acrylate, pentyl acrylate, hexyl acrylate, 1-vinyl naphthalene, 2-vinyl naphthalene, 3-methyl styrene, 4-propyl styrene, t-butyl styrene, 4-cyclohexyl styrene, 4-dodecyl styrene, 2-ethyl-4-benzyl styrene, and 4-(phenyl butyl) styrene. Combinations of hydrophobic monomers can also be used.

Examples of optional non-ionic monomers include $C_1$-$C_6$ alkyl esters of (meth)acrylic acid and the alkali or alkaline earth metal or ammonium salts thereof, acrylamide and the $C_1$-$C_6$ alkyl-substituted acrylamides, the N-alkyl-substituted acrylamides and the N-alkanol-substituted acrylamides, hydroxyl alkyl acrylates and acrylamides. Also useful are the $C_1$-$C_6$ alkyl esters and $C_1$-$C_6$ alkyl half-esters of unsaturated vinylic acids, such as maleic acid and itaconic acid, and $C_1$-$C_6$ alkyl esters of saturated aliphatic monocarboxylic acids, such as acetic acid, propionic acid and valeric acid. In one aspect the nonionic monomers are selected from the group consisting of methyl methacrylate, methyl acrylate, hydroxyethyl (meth)acrylate and hydroxypropyl (meth)acrylate.

Process for Producing Sulfonated Graft Copolymers—

The present invention provides a process for making sulfonated graft copolymers. The graft copolymers are made using a redox system of a metal ion and hydrogen peroxide. In another aspect, the graft copolymers are made using free radical initiating systems such as ceric ammonium nitrate and Fe (II)/$H_2O_2$ (see, Würzburg, O. B., MODIFIED STARCHES: PROPERTIES AND USES, *Grafted Starches*, Chpt. 10, pp. 149-72, CRC Press, Boca Raton (1986)). Fe (II) can be substituted with other metal ions such as Cu (II), Co (III), Mn (III) and others. Unlike the free radical initiating systems, chain transfer agents such as mercaptans and/or amines tend to produce excessive amounts of synthetic homopolymers (if one monomer is used) or copolymers (if more than one monomer is used) and therefore are not preferred. Process reaction temperature ranges from about 40° C. to about 130° C. In another aspect, reaction temperature ranges from about 80° C. to about 100° C.

Sulfonated graft copolymers according to the present invention have been found to be excellent dispersants and scale minimizing agents in a wide variety of aqueous systems. These systems include but are not limited to water treatment, cleaning formulations, oilfield, and pigment dispersion. These systems are described in further detail below. In another aspect, the sulfonated graft copolymers have been found to be excellent sizing agents for fiberglass, non-wovens and textiles.

Cleaning Formulations—

Sulfonated graft copolymers according to the present invention can be used in a variety of cleaning formulations. Such formulations include both powdered and liquid laundry formulations such as compact and heavy duty detergents (e.g., builders, surfactants, enzymes, etc.), automatic dishwashing detergent formulations (e.g., builders, surfactants, enzymes, etc.), light-duty liquid dishwashing formulations, rinse aid formulations (e.g., acid, nonionic low foaming surfactants, carrier, etc.) and/or hard surface cleaning formulations (erg., zwitterionic surfactants, germicide, etc.).

The sulfonated graft copolymers can be used as viscosity reducers in processing powdered detergents. They can also serve as anti-redeposition agents, dispersants, scale and deposit inhibitors, and crystal modifiers, providing whiteness maintenance in the washing process.

Any suitable adjunct ingredient in any suitable amount can be used in the cleaning formulations described herein. Useful adjunct ingredients include, for example, aesthetic agents, anti-filming agents, anti-redeposition agents, anti-spotting agents, anti-graying agents, beads, binders, bleach activators, bleach catalysts, bleach stabilizing systems, bleaching agents, brighteners, buffering agents, builders, carriers, chelants, clay, color speckles, control release agents, corrosion inhibitors, dishcare agents, disinfectant, dispersant agents, draining promoting agents, drying agents, dyes, dye transfer inhibiting agents, enzymes, enzyme stabilizing systems, fillers, free radical inhibitors, fungicides, germicides, hydrotropes, opacifiers, perfumes, pH adjusting agents, pigments, processing aids, silicates, soil release agents, suds suppressors, surfactants, stabilizers, thickeners, zeolite, and mixtures thereof.

The cleaning formulations can further include builders, enzymes, surfactants, bleaching agents, bleach modifying materials, carriers, acids, corrosion inhibitors and aesthetic agents. Suitable builders include, but are not limited to, alkali metals, ammonium and alkanol ammonium salts of polyphosphates, alkali metal silicates, alkaline earth and alkali metal carbonates, nitrilotriacetic acids, polycarboxylates, (such as citric acid, mellitic acid, succinic acid, oxydisuccinic acid, polymaleic acid, benzene 1,3,5-tricarboxylic acid, carboxymethyl oxysuccinic acid, and water-soluble salts thereof), phosphates (e.g., sodium tripolyphosphate), and mixtures thereof. Suitable enzymes include, but are not limited to, proteases, amylases, cellulases, lipases, carbohydrases, bleaching enzymes, cutinases, esterases, and wild-type enzymes. Suitable surfactants include, but are not limited to, nonionic surfactants, anionic surfactants, cationic surfactants, ampholytic surfactants, zwitterionic surfactants, and mixtures thereof. Suitable bleaching agents include, but are not limited to, common inorganic/organic chlorine bleach (e.g., sodium or potassium dichloroisocyanurate dihydrate, sodium hypochlorite, sodium hypochloride), hydrogen-peroxide releasing salt (such as, sodium perborate monohydrate (PB1), sodium perborate tetrahydrate (PB4)), sodium percarbonate, sodium peroxide, and mixtures thereof. Suitable bleach-modifying materials include but are not limited to hydrogen peroxide-source bleach activators (e.g., TAED), bleach catalysts (e.g. transition containing cobalt and manganese). Suitable carriers include, but are not limited to: water, low molecular weight organic solvents (e.g., primary alcohols, secondary alcohols, monohydric alcohols, polyols, and mixtures thereof), and mixtures thereof.

Suitable acids include, but are not limited to, acetic acid, aspartic acid, benzoic acid, boric acid, bromic acid, citric acid, formic acid, gluconic acid, glutamic acid, hydrochloric acid, lactic acid, malic acid, nitric acid, sulfamic acid, sulfuric acid, tartaric acid, and mixtures thereof. Suitable corrosion inhibitors, include, but are not limited to, soluble metal salts, insoluble metal salts, and mixtures thereof. Suitable metal salts include, but are not limited to, aluminum, zinc (e.g., hydrozincite), magnesium, calcium, lanthanum, tin, gallium, strontium, titanium, and mixtures thereof. Suitable aesthetic agents include, but are not limited to, opacifiers, dyes, pigments, color speckles, beads, brighteners, and mixtures thereof.

With the addition of suitable adjuncts, cleaning formulations described herein can be useful as automatic dishwashing detergent ('ADD') compositions (e.g., builders, surfactants, enzymes, etc.), light-duty liquid dishwashing compositions, laundry compositions such as, compact and heavy-duty detergents (e.g., builders, surfactants, enzymes, etc.), rinse aid compositions (e.g., acids, nonionic low-foaming surfactants, carriers, etc.), and/or hard surface cleaning compositions (e.g., zwitterionic surfactants, germicides, etc.).

Suitable adjunct ingredients are disclosed in one or more of the following: U.S. Pat. Nos. 2,798,053; 2,954,347; 2,954,347; 3,308,067; 3,314,891; 3,455,839; 3,629,121; 3,723,322; 3,803,285; 3,929,107, 3,929,678; 3,933,672; 4,133,779, 4,141,841; 4,228,042; 4,239,660; 4,260,529; 4,265,779; 4,374,035; 4,379,080; 4,412,934; 4,483,779; 4,483,780; 4,536,314; 4,539,130; 4,565,647; 4,597,898; 4,606,838; 4,634,551; 4,652,392; 4,671,891; 4,681,592; 4,681,695; 4,681,704; 4,686,063; 4,702,857; 4,968,451; 5,332,528; 5,415,807; 5,435,935; 5,478,503; 5,500,154; 5,565,145; 5,670,475; 5,942,485; 5,952,278; 5,990,065; 6,004,922; 6,008,181; 6,020,303; 6,022,844; 6,069,122; 6,060,299; 6,060,443; 6,093,856; 6,130,194; 6,136,769; 6,143,707; 6,150,322; 6,153,577; 6,194,362; 6,221,825; 6,365,561; 6,372,708; 6,482,994; 6,528,477; 6,573,234; 6,589,926; 6,627,590; 6,645,925; and 6,656,900; International Publication Nos. 00/23548; 00/23549; 00/47708; 01/32816; 01/42408; 91/06637; 92/06162; 93/19038; 93/19146; 94/09099; 95/10591; 95/26393; 98/35002; 98/35003; 98/35004; 98/35005; 98/35006; 99/02663; 99/05082; 99/05084; 99/05241; 99/05242; 99/05243; 99/05244; 99/07656; 99/20726; and 99/27083; European Patent No. 130756; British Publication No. 1137741 A; Chemtech, pp. 30-33 (March 1993); J. American Chemical Soc., 115, 10083-10090 (1993); and Kirk Othmer Encyclopedia of Chemical Technology, 3rd Ed., Vol. 7, pp. 430-447 (John Wiley & Sons, Inc., 1979).

In one embodiment, cleaning formulations according to the present invention can include a suitable adjunct ingredient in an amount of from 0% to about 99.99% by weight of the formulation. In another aspect, the cleaning formulations can include from about 0.01% to about 95% by weight of the formulation of a suitable adjunct ingredient. In other various aspects, the cleaning formulations can include from about 0.01% to about 90%, or from about 0.01% to about 80%, or from about 0.01% to about 70%, or from about 0.01% to about 60%, or from about 0.01% to about 50%, or from about 0.01% to about 40%, or from about 0.01% to about 30%, or from about 0.01% to about 20%, or from about 0.01% to about 10%, or from about 0.01% to about 5%, or from about 0.01% to about 4%, or from about 0.01% to about 3%, or from about 0.01% to about 2%, or from about 0.01% to about 1%, or from about 0.01% to about 0.5%, or alternatively from about 0.01% to about 0.1% by weight of the formulation of a suitable adjunct ingredient.

Cleaning formulations can be provided in any suitable physical form. Examples of such forms include solids, granules, powders, liquids, pastes, creams, gels, liquid gels, and combinations thereof. Cleaning formulations used herein include unitized doses in any of a variety of forms, such as tablets, multi-phase tablets, gel packs, capsules, multi-compartment capsules, water-soluble pouches or multi-compartment pouches. Cleaning formulations can be dispensed from any suitable device. Suitable devices include, but are not limited to, wipes, hand mittens, boxes, baskets, bottles (e.g., pourable bottles, pump assisted bottles, squeeze bottles), multi-compartment bottles, jars, paste dispensers, and combinations thereof.

In the case of additive or multi-component products contained in single- and/or multi-compartment pouches, capsules, or bottles, it is not required that the adjunct ingredients or cleaning formulations be in the same physical form. In one non-limiting embodiment, cleaning formulations can be provided in a multi-compartment, water-soluble pouch comprising both solid and liquid or gel components in unit dose form. The use of different forms can allow for controlled release (e.g., delayed, sustained, triggered or slow release) of the cleaning formulation during treatment of a surface (e.g., during one or more wash and/or rinse cycles in an automatic dishwashing machine).

The pH of these formulations can range from 1 to 14 when the formulation is diluted to a 1% solution. Most formulations are neutral or basic, meaning in the pH range of 7 to about 13.5. However, certain formulations can be acidic, meaning a pH range from 1 to about 6.5.

Copolymers according to the present invention can also be used in a wide variety of cleaning formulations containing phosphate-based builders. These formulations can be in the form of a powder, liquid or unit doses such as tablets or capsules, and can be used to clean a variety of substrates such as clothes, dishes, and hard surfaces such as bathroom and kitchen surfaces. The formulations can also be used to clean surfaces in industrial and institutional cleaning applications.

In cleaning formulations, the polymer can be diluted in the wash liquor to end use level. The polymers are typically dosed at 0.01 to 1000 ppm in the aqueous wash solutions.

Optional components in detergent formulations include, but are not limited to, ion exchangers, alkalies, anticorrosion materials, anti-redeposition materials, optical brighteners, fragrances, dyes, fillers, chelating agents, enzymes, fabric whiteners and brighteners, sudsing control agents, solvents, hydrotropes, bleaching agents, bleach precursors, buffering agents, soil removal agents, soil release agents, fabric softening agent and opacifiers. These optional components can comprise up to about 90% by weight of the detergent formulation.

Graft copolymers according to the present invention can be incorporated into hand dish, autodish and hard surface cleaning formulations. The polymers can also be incorporated into rinse aid formulations used in autodish formulations. Autodish formulations can contain builders such as phosphates and carbonates, bleaches and bleach activators, and silicates. These polymers can also be used in reduced phosphate formulations (i.e., less than 1500 ppm in the wash) and zero phosphate autodish formulations. In zero-phosphate autodish formulations, removal of the phosphates negatively affects cleaning, as phosphates provide sequestration and calcium carbonate inhibition. Graft copolymers according to the present invention aid in sequestration and threshold inhibition, as well as soil removal and therefore are suitable for use in zero-phosphate autodish formulations. Further, graft copolymers according to the present invention are useful in minimizing spotting and filming in rinse aid compositions for automatic dishwasher applications.

The above formulations can also include other ingredients such as enzymes, buffers, perfumes, anti-foam agents, processing aids, and so forth. Hard surface cleaning formulations can contain other adjunct ingredients and carriers. Examples of adjunct ingredients include, without limitation, buffers, builders, chelants, filler salts, dispersants, enzymes, enzyme boosters, perfumes, thickeners, clays, solvents, surfactants and mixtures thereof.

One skilled in the art will recognize that the amount of polymer(s) required depends upon the cleaning formulation and the benefit they provide to the formulation. In one aspect, use levels can be about 0.01 weight % to about 10 weight % of the cleaning formulation. In another embodiment, use levels can range from about 0.1 weight % to about 2 weight % of the cleaning formulation.

Water Treatment Systems—

A common problem in industrial water treatment is waterborne deposits, commonly known as foulants. Foulants are loose, porous, insoluble materials suspended in water. They can include such diverse substances as particulate matter scrubbed from the air, migrated corrosion products, silt, clays and sand suspended in the makeup water, organic contaminants (oils), biological matter, and extraneous materials such as leaves, twigs and wood fibers from cooling towers. Fouling can reduce heat transfer by interfering with the flow of cooling water. Additionally, fouling can reduce heat transfer efficiency by plugging heat exchangers. Sulfonated graft copolymers according to the present invention are excellent dispersants for foulants, and can minimize their deleterious effects in water treatment applications.

Water treatment includes prevention of calcium scale due to precipitation of calcium salts such as calcium carbonate, calcium sulfate and calcium phosphate. These salts are inversely soluble, meaning that their solubility decreases as the temperature increases. For industrial applications where higher temperatures and higher concentrations of salts are present, this usually translates to precipitation occurring at the heat transfer surfaces. The precipitating salts can then deposit onto the surface, resulting in a layer of calcium scale. Calcium scale can lead to heat transfer loss in the system and cause overheating of production processes. This scaling can also promote localized corrosion.

Calcium phosphate, unlike calcium carbonate, is generally not a naturally occurring problem. However, orthophosphates are commonly added to industrial systems (and sometimes to municipal water systems) as a corrosion inhibitor for ferrous metals, typically at levels between 2.0-20.0 mg/L. Therefore, calcium phosphate precipitation can not only result in those scaling problems previously discussed, but can also result in severe corrosion problems as the orthophosphate is removed from solution. As a consequence, industrial cooling systems require periodic maintenance wherein the system must be shut down, cleaned and the water replaced. Lengthening the time between maintenance shutdowns saves costs and is desirable.

One way to lengthen the time between maintenance in a water treatment system is to use polymers that function in either inhibiting formation of calcium salts or in modifying crystal growth. Crystal growth modifying polymers alter the crystal morphology from regular structures (e.g., cubic) to irregular structures such as needlelike or florets. Because of the change in form, crystals that are deposited are easily removed from the surface simply by mechanical agitation resulting from water flowing past the surface. Sulfonated graft copolymers according to the present invention are particularly useful at inhibiting calcium phosphate based scale formation such as calcium orthophosphate. Further, these inventive copolymers also modify crystal growth of calcium carbonate scale.

It is also advantageous to reuse the water in industrial water treatment systems as much as possible, thereby increasing the time between maintenance. Still, water can be lost over time due to various mechanisms such as evaporation and/or spillage. As a consequence, dissolved and suspended solids tend to become more concentrated over time. Cycles of concentration refers to the number of times solids in a particular volume of water are concentrated. The quality of the water makeup determines how many cycles of concentration can be tolerated. In cooling tower applications where water makeup is hard (i.e., poor quality), 2 to 4 cycles would be considered normal, while 5 and above would represent stressed conditions. Sulfonated graft copolymers according to the present invention have been found to be effective under stressed conditions.

Copolymers according to the present invention can be added to the aqueous systems neat, or they can be formulated into various water treatment compositions and then added to the aqueous systems. In certain aqueous systems where large volumes of water are continuously treated to maintain low levels of deposited matter, the copolymers can be used at levels as low as 0.5 mg/L. The upper limit on the amount of copolymer used depends upon the particular aqueous system treated. For example, when used to disperse particulate matter, the copolymer can be used at levels ranging from about 0.5 to about 2,000 mg/L. When used to inhibit formation or deposition of mineral scale, the copolymer can be used at levels ranging from about 0.5 to about 100 mg/L. In another embodiment the copolymer can be used at levels from about 3 to about 20 mg/L, and in another embodiment from about 5 to about 10 mg/L.

Once prepared, the sulfonated graft copolymers can be incorporated into an aqueous treatment composition that includes the graft copolymer and other aqueous treatment chemicals. These other chemicals can include, for example, corrosion inhibitors such as orthophosphates, zinc compounds and tolyltriazole. The amount of inventive copolymer utilized in water treatment compositions can vary based upon the treatment level desired for the particular aqueous system treated. Water treatment compositions generally contain from about 0.001 to about 25% by weight of the sulfonated graft copolymer. In another aspect, the copolymer is present in an amount of about 0.5% to about 5% by weight of the aqueous treatment composition.

Sulfonated graft copolymers according to the present invention can be used in any aqueous system wherein stabilization of mineral salts is important, such as in heat transfer devices, boilers, secondary oil recovery wells, automatic dishwashers, and substrates that are washed with hard water. These graft copolymers can stabilize many minerals found in water, including, but not limited to, iron, zinc, phosphonate, and manganese. These copolymers also disperse particulates found in aqueous systems.

Sulfonated graft copolymers according to the present invention can be used to inhibit scales, stabilize minerals and disperse particulates in many types of processes. Examples of such processes include sugar mill anti-sealant, soil conditioning, treatment of water for use in industrial processes such as mining, oilfields, pulp and paper production, and other similar processes, waste water treatment, ground water remediation, water purification by processes such as reverse osmosis and desalination, air-washer systems, corrosion inhibition, boiler water treatment, as a biodispersant, and chemical cleaning of scale and corrosion deposits. One skilled in the art can conceive of many other similar applications for which the sulfonated graft copolymer could be useful.

Oilfield Scale Application—

There is a lot of pressure on the oil field industry to use biodegradable materials. This is especially true in the North Sea. Biodegradability in oil field applications is typically measured by OECD 306b testing, which is conducted in sea water. If the test sample is found to be greater than 60% biodegradable in 28 days it is termed to be readily biodegradable, and if found to be greater than 20% biodegradable in 28 days it is termed to be inherently biodegradable. Sulfonated graft copolymers typically derive their biodegradable profile from the hydroxyl-containing natural moiety. Therefore, sulfonated graft copolymers according to the present invention preferably have about 20 weight % or greater hydroxyl-containing natural moiety. In another aspect, sulfonated graft copolymers according to the present invention have about 60 weight % or greater hydroxyl-containing natural moiety. The performance of these sulfonated graft copolymers with these levels of hydroxyl-containing natural moieties are preferably similar to that of their synthetic counterparts.

Sulfonated graft copolymers according to the present invention may be used in a number of oil field applications such as cementing, drilling muds, general dispersancy and spacer fluid applications. These applications are described in some detail below.

Often the water encountered in oilfield applications is sea water or brines from the formation and therefore can be very brackish. Hence, polymers used in oilfield applications need to be soluble in many brines and brackish waters. These brines may be sea water containing about 3.5% NaCl by weight, or more severe brines that contain, for example, up to 3.5% KCl, up to 25% NaCl and up to 20% $CaCl_2$. Therefore, the polymers have to be soluble in these systems for them to be effective as scale inhibitors. The higher the solubility of the sulfonated graft copolymers in the brine, the higher its compatibility will be. One system frequently encountered in the oilfield is sea water. In one embodiment, the sulfonated graft copolymers are soluble at about 5 to 1000 ppm levels in sea water. In another aspect, the polymers are soluble at 10,000 or even 100,000 ppm levels. For example, the sulfonated graft copolymers can be soluble at 5 to 1000 ppm levels in moderate calcium brine, or, in another aspect, at 10,000 or 100,000 ppm levels. In another aspect the sulfonated graft copolymers are soluble at 5 to 1000 ppm levels in severe calcium brine, or even at 10,000 or 100,000 ppm levels.

A number of synthetic anionic polymers are not brine compatible. It has been found that sulfonated graft copolymers according to the present invention are extremely brine compatible. This is because the hydroxyl-containing natural moiety adds nonionic character to the sulfonated graft copolymers, enhancing their compatibility in these brine systems. Sulfonated graft copolymers according to the present invention can have about 10 weight % or more of the hydroxyl-containing natural moiety. In another aspect the copolymers have about 20 weight % or more of the hydroxyl-containing natural moiety for brine compatibility. Also, the lower the pH of the polymer, the better the brine compatibility will be. Due to the relatively high cost of the sulfonated monomers, the synthetic part of the sulfonated graft copolymer in most cases will contain carboxylic acid-containing monomers. In this case, the sulfonated monomer can be about 5 mole % or greater of the synthetic component. In another aspect, the monomer is about 10 mole % or greater. In even another aspect, the monomer is about 20 mole % or greater of the synthetic component.

The composition of synthetic seawater, moderate and severe calcium brines, which are typical brines encountered in the oilfield, is listed in Table 1 below.

TABLE 1

Typical brines encountered in the oilfield
Brine Preparation

| Brine number and description | grams per liter | | | ppm | | |
|---|---|---|---|---|---|---|
| | NaCl | CaCl$_2$•2H$_2$O | MgCl$_2$•6H$_2$O | Na | Ca | Mg |
| 1 Synthetic seawater | 24.074 | 1.61 | 11.436 | 9471 | 439 | 1368 |
| 2 Moderate calcium brine | 63.53 | 9.19 | — | 24992 | 2506 | 0 |
| 3 Severe calcium brine | 127.05 | 91.875 | — | 49981 | 25053 | 0 |

As described in Table 1, sea water contains around 35 grams per liter of a mixture of salts. The moderate and severe calcium brines contain around 70 and 200 grams per liter of a mixture of salts respectively.

Cementing of Oil Wells—

A variety of procedures involving hydraulic cement compositions are utilized in the construction and repair of wells such as oil, gas and water wells. For example, in the completion of a well after a well bore has been drilled into one or more subterranean producing formations, a pipe such as casing is disposed in the well bore and a hydraulic cement composition is pumped into the annular space between the walls of the well bore and the exterior of the pipe. The cement composition is allowed to set in the annular space whereby an annular cement sheath is formed therein which bonds the pipe to the walls of the well bore and prevents the undesirable flow of fluids into and through the annular space.

In repairing producing wells, hydraulic cement compositions are often utilized to plug holes or cracks in the pipe disposed in the well bore; to plug holes, cracks, voids or channels in the aforementioned cement sheath between the pipe and the well bore; to plug permeable zones or fractures in subterranean formations, and the like. The holes, cracks, etc., are repaired by forcing hydraulic cement compositions therein, hardening and forming impermeable plugs.

High temperatures are frequently encountered in deep subterranean zones to be cemented. The combination of the depth of the zone and the high temperature thereof often results in the requirement that the setting time of the cement composition be extended to allow the cement composition to be pumped into the zone to be cemented. Set retarding additives have been developed and used for this purpose, and such additives have been mixed with well cement compositions in amounts sufficient to delay the setting of the compositions until they can be pumped into desired subterranean locations.

The sulfonated graft copolymers of this invention may be used as dispersants, set retarding, fluid loss or gas migration prevention additives in these cementing applications. This is particularly true if the sulfonated graft copolymers are made from anionic monomers containing carboxylic acid or phosphonic acid groups. In addition, non-ionic monomers may be used to improve or enhance performance.

The set retarded hydraulic cement compositions of this invention are basically comprised of hydraulic cement, sufficient water to form a slurry of the cement and a copolymer set retarding additive described above. While various hydraulic cements can be utilized in the cement compositions, Portland cement is generally preferred, and can be, for example, one or more of the various types identified as API Classes A-H and J cements. These cements are classified and defined in API Specification for Materials and Testing for Well Cements, API Specification 10A, 21st Edition dated Sep. 1, 1991, of the American Petroleum Institute, Washington, D.C. API Portland cements generally have a maximum particle size of about 90 microns and a specific surface (sometimes referred to as Blaine Fineness) of about 3900 square centimeters per gram. A highly useful and effective cement slurry base for use in accordance with this invention comprises API Class H Portland cement mixed with water to provide a density of from about 11.3 to about 18.0 pounds per gallon.

It is often highly advantageous to use fine particle size hydraulic cement consisting of particles having diameters no larger than about 30 microns and having a Blaine Fineness no less than about 6000 square centimeters per gram. Preferably, the fine cement particles have diameters no larger than about 17 microns and most preferably no larger than about 11 microns. The Blaine Fineness is preferably greater than about 7000 square centimeters per gram, more preferably about 10,000 square centimeters per gram and still more preferably greater than about 13,000 square centimeters per gram. Methods of utilizing such fine particle size hydraulic cement in well completion and remedial operations are disclosed in U.S. Pat. No. 5,121,795 issued Jun. 16, 1992 and U.S. Pat. No. 5,125,455 issued Jun. 30, 1992 both of which are incorporated herein by reference.

The water used in the cement compositions of this invention can be water from any source, provided that it does not contain an excess of compounds which adversely react with or otherwise affect other components in the cement compositions. The water is present in a cement composition of this invention in an amount sufficient to form slurry of the cement, preferably, slurry which is readily pumpable. Generally, the water is present in the range of from about 30% to about 60% by weight of dry cement in the composition when the cement is of normal particle size. When a cement of fine particle size as described above is used, water is present in the cement composition in an amount in the range of from about 100% to about 200% by weight of dry cement in the composition, and a dispersing agent such as the dispersing agent described in U.S. Pat. No. 4,557,763 issued on Dec. 10, 1985 is generally included to facilitate the formation of the cement slurry and prevent the premature gelation thereof.

Sulfonated graft copolymers according to the present invention can be used in cement compositions in amounts sufficient to delay or retard the setting of the compositions for time periods required to place the compositions in desired locations. When the cement compositions are utilized to carry out completion, remedial and other cementing operations in subterranean zones penetrated by well bores, the compositions must remain pumpable for periods of time long enough to place them in the subterranean zones to be cemented. The thickening and set times of cement compositions are strongly dependent upon temperature, and to obtain optimum results in well applications, a quantity of a copolymer set retarding additive of this invention required to provide the necessary pumping time at the temperature to be encountered is included in a cement composition to be utilized. Such quantity can be determined in advance by performing thickening time tests of the type described in the above mentioned API Specification 10A.

Generally an aqueous solution of a set retarding copolymer of this invention which is about 40% active is combined with cement slurry in an amount whereby the copolymer is present in the resulting set retarded cement composition in an amount in the range of from about 0.01% to about 5.0% by weight of dry cement in the composition.

A variety of other additives are often included in well cement compositions in addition to the set retarding additives. Such other additives are well known to those skilled in the art and are included in well cement compositions to vary the composition density, increase or decrease strength, control fluid loss, reduce viscosity, increase resistance to corrosive fluids and the like. Essentially, a cement composition meeting the specifications of the American Petroleum Institute is mixed with water and other additives to provide cement slurry appropriate for the conditions existing in each individual well to be cemented.

The methods of this invention for cementing a subterranean zone penetrated by a well bore are basically comprised of the steps of forming a pumpable set retarded cement composition of this invention, pumping the cement composition into the subterranean zone by way of the well bore, and then allowing the cement composition to set therein.

Spacer Fluid Compositions

While drilling oil and gas wells, a drilling fluid is circulated through the string of drill pipe, through the drill bit and upwardly to the earth's surface through the annulus formed between the drill pipe and the surface of the well bore, thereby cooling the drill bit, lubricating the drill string and removing cuttings from the well bore.

When the desired drilling depth of the well is reached, another "performance" fluid, such as slurry containing a cement composition, is pumped into the annular space between the walls of the well bore and pipe string or casing. In this process, known as "primary cementing," the cement composition sets in the annulus, supporting and positioning the casing, and forming a substantially impermeable barrier, or cement sheath, which isolates the casing from subterranean zones.

A spacer fluid is a fluid used to displace one performance fluid, such as a drilling fluid, in a well bore before the introduction into the well bore of another performance fluid, such as a cement slurry. Spacer fluids are often used in oil and gas wells to facilitate improved displacement efficiency when pumping new fluids into the well bore. Spacer fluids are also used to enhance solids removal during drilling operations, to enhance displacement efficiency and to physically separate chemically incompatible fluids. For instance, in primary cementing, the cement slurry is separated from the drilling fluid and partially dehydrated gelled drilling fluid may be removed from the walls of the well bore by a spacer fluid pumped between the drilling fluid and the cement slurry. Spacer fluids may also be placed between different drilling fluids during drilling fluid change outs or between a drilling fluid and a completion brine.

The present invention provides improved spacer fluids which may be interposed between the drilling fluid in the wellbore and either a cement slurry or a drilling fluid which has been converted to a cementitious slurry. The spacer fluid serves as a buffer between the drilling fluid and the cement slurry, and as a flushing agent to evacuate the drilling fluid from the wellbore resulting in improved displacement efficiency regarding drilling fluid removal and improved bonding of the cementitious slurry to surfaces in the wellbore such as the casing or drillpipe wall surfaces.

The spacer fluid of the present invention comprises a sulfonated graft copolymer dispersant and one or more additional components selected from surfactants, viscosifiers and weighting materials to form a rheologically compatible fluid between the drilling fluid and the cementitious slurry.

The present invention also provides a method of using the spacer fluid. In the method of this invention, a spacer fluid which comprises a sulfonated graft copolymer dispersant is introduced into the wellbore, and a completion fluid, such as a cement slurry, is introduced to displace the spacer fluid.

Drilling Fluids

All fluids used in a well bore during drilling operations may be classified as drilling fluids. The term is generally restricted to those fluids which are circulated in the bore hole in rotary drilling. The rotary system of drilling requires the circulation of a drilling fluid in order to remove the drilled cuttings from the bottom of the hole and thus keep the bit and the bottom of the hole clean. Drilling fluids are usually pumped from the surface down through a hollow drill pipe to the bit and the bottom of the hole and returned to the surface through the annular space outside the drill pipe. Any caving or sloughing from the formations already drilled and exposed in the bore hole must be raised to the surface together with the drill cuttings by mud circulation. The casing and larger drill cuttings are separated from the mud at the surface by flowing and mud through the moving screen of a shale shaker and by settling in the mud pits. The flowing drilling fluid cools the bit and the bottom of the hole. The mud usually offers some degree if lubrication between the drill pipe and the wall of the hole. Flows of oil, gas and brines in to the well bore are commonly prevented by overbalancing or exceeding formation pressures with the hydrostatic pressure of the mud column.

One of the primary functions of a drilling mud is the maintenance and preservation of the hole already drilled. The drilling fluid must permit identification of drill cuttings and identification of any shows of oil or gas in the cuttings. It must permit the use of the desired logging materials and other well completion practices. Finally, the drilling fluid should not impair the permeability of any oil or gas bearing formations penetrated by the well.

Most of the drilling fluids are drilling muds, which are suspensions of solids in liquids or in solids in liquid emulsions. The densities of such systems are adjusted between 7 and 21 lbs/gal, or 0.85 to 2.5 specific gravity. When water is used in the liquid phase the lower limit of the density is about 8.6 to 9 lbs/gal. In addition to density, other important properties of such suspensions may be adjusted within suitable limits. The filtration quality may be controlled. In addition to density, other important properties of such suspensions may be adjusted within suitable limits. The filtration quality may be controlled by having a portion of the solids consist of particles of such small size and nature that very little of the liquid phase will escape through the filter cake of solids formed around the bore hole. Control over the viscosity and gel forming character of such suspensions is achieved within limits by the amount and kind of solids in the suspension and by the use of chemicals which reduce the internal resistance of such suspensions so that they will flow easily and smoothly. The vast majority of drilling muds are suspension of clays and other solids in water, and are referred to as water based mud. Oil based mud is a suspension of solids in oil. High flash point diesel oils are commonly used in the liquids phase and the necessary finely dispersed solid is obtained by adding oxidized asphalt. Common weighting agents are used to increase the density. The viscosity and thixotropic properties are controlled by surfactants and other chemicals. Oil based mud is used for special purposes such as preventing the caving of certain shale and as completion mud for drilling in to sensitive sands which are damaged by water.

Water based mud consists basically of a liquid phase, water and emulsion, a colloidal phase, principally clays, an inert phase principally barite weight material and fine sand and a chemical phase consisting of ions and substances in solution which influence and control the behavior of colloidal materials such as clays.

Colloidal material is necessary in a mud to produce higher viscosities for removing cuttings and caving from the hole and for suspending the inert materials such as finely ground barite. The principal material used is bentonite, which is a rock deposit. The desirable material in the rock is montmorillonite. In addition to yielding viscosity and suspending weight material, these clays produce a mud that has low filtration loss. Special clays are used in mud saturated with salt water, and these are typically attapulgite. Starch and sodium carboxymethyl cellulose are used as auxiliary colloids for supplementing the mud properties produced by the clays.

Inert solids in drilling mud include silica, quartz and other inert mineral grains. These inerts are finely ground weight material and lost circulation materials. A commonly used weight material is barite, which has a specific gravity of 4.3. Barite is a soft mineral and therefore minimizes abrasion on pump valves and cylinders. It is insoluble and relatively inexpensive and therefore is widely used. Lost circulation materials are added to mud when losses of whole mud occur in crevices or cracks in exposed rocks in the well bore. The commonly used loss circulation materials include shredded cellophane flakes, mica flakes, cane fibers, wood fibers, ground walnut shells and perlite.

The chemical phase of water based mud controls the colloidal phase particularly in the case of bentonite type clays. The chemical phase includes soluble salts which enter the mud from the drill cuttings and the disintegrated portions of the hole and those present in the make up water added to the mud. The chemical phase also includes soluble treating chemicals which are used for reducing the viscosity and gel strength of the mud. These chemicals include inorganic materials such as caustic soda, lime, bicarbonate of soda and soda ash. Phosphates such as sodium tetraphosphate may be used to reduce mud viscosities and gel strengths.

In addition to clays and barite, the mud system contains calcium sulfate, a fluid loss reducing agent such as sodium carboxymethyl cellulose and suitable surfactants. The surfactants include a primary surfactant which controls the rheological properties (viscosity and gelation) of the mud, a defoamer and an emulsifier.

It is well known that in perforating earthen formations to tap subterranean deposits such as gas or oil, that perforation is accomplished by well drilling tools and a drilling fluid. These rotary drilling systems consist of a drilling bit fitted with appropriate 'teeth', then a set of pipes assembled rigidly together end to end, the diameter of which is smaller than that of the drilling bit. This whole rigid piece of equipment, drill bit and drill pipe string, is driven into rotation from a platform situated above the well being drilled. As the drill bit attacks and goes through the geological strata, the crushed mineral materials must be cleared away from the bottom of the hole to enable the drilling operation to continue. Aqueous clay dispersion drilling fluids are recirculated down through the hollow pipe, across the face of the drill bit, and upward through the hole.

The drilling fluid serves to cool and lubricate the drill bit, to raise the drilling cuttings to the surface of the ground, and to seal the sides of the well to prevent loss of water and drilling fluids into the formation through which the drill hole is being bored. After each passage through the well, the mud is passed through a settling tank or trough wherein the sand and drill cuttings are separated, with or without screening. The fluid is then again pumped into the drill pipe by a mud pump.

Some of the most serious problems encountered in producing and maintaining effective clay-based aqueous drilling fluids are caused by the interaction of the mud with the earth formation being drilled. These interactions include contamination of the mud by formation fluids, incorporation into the mud of viscosity producing and inert drilled solids, chemical contamination by drilled solids, or by the infiltration of seawater and/or fresh water. The conditions of high temperature and pressure inherent with deeper and deeper drilling operations, together with formation interactions, make drilling fluid behavior unreliable and difficult to reproduce.

Characteristics of an ideal drilling fluid may include the following:
i) To have rheological characteristics as desirable as possible to be able to transport the mineral cuttings set in dispersion.
ii) To allow the separation of cuttings by all known means as soon as the mud flows out of the hole.
iii) To have such required density as to exert sufficient pressure on the drilled geological formations.
iv) To retain its fundamental Theological qualities as it is submitted, in very deep drilling, to higher and higher temperatures.

Scale Inhibition in the Oil Field

Scale formation is a major problem in oilfield applications. Subterranean oil recovery operations can involve the injection of an aqueous solution into the oil formation to help move the oil through the formation and to maintain the pressure in the reservoir as fluids are being removed. The injected water, either surface water (lake or river) or seawater (for operations offshore) can contain soluble salts such as sulfates and carbonates. These salts tend to be incompatible with ions already present in the oil-containing reservoir (formation water). The formation water can contain high concentrations of certain ions that are encountered at much lower levels in normal surface water, such as strontium, barium, zinc and calcium. As conditions affecting solubility, such as temperature and pressure, change within the producing well bores and topsides, partially soluble inorganic salts such as barium sulfate and calcium carbonate often precipitate from the production water. This is especially prevalent when incompatible waters are encountered such as formation water, seawater, or produced water.

Barium sulfate or other inorganic supersaturated salts such as strontium sulfate can precipitate onto the formation forming scale, thereby clogging the formation and restricting the recovery of oil from the reservoir. These salts can form very hard, insoluble scales that are difficult to prevent. The insoluble salts can also precipitate onto production tubing surfaces and associated extraction equipment, limiting productivity, production efficiency and compromising safety. Certain oil-containing formation waters are known to contain high barium concentrations of 400 ppm and higher. Since barium sulfate forms a particularly insoluble salt, the solubility of which declines rapidly with increasing temperature, it is difficult to inhibit scale formation and to prevent plugging of the oil formation and topside processes and safety equipment.

Dissolution of sulfate scales is difficult, requiring high pH, long contact times, heat and circulation, and therefore is typically performed topside. Alternatively, milling and, in some cases, high-pressure water washing can be used. These are expensive, invasive procedures and require process shutdown.

Scale inhibitors are an example of one type of chemical used in oilfield applications such as in production wells to stop scaling in the reservoir rock formation matrix, in production lines downhole, and/or at the surface. Scale can cause a restriction in pore size in the reservoir rock formation matrix (also known as 'formation damage') thereby reducing the rate of oil and/or gas production, as well as blockage of tubular and pipe equipment during surface processing. Use of sulfonated graft copolymers according to the present invention can minimize these sulfate scales, especially downhole.

In one embodiment, the present invention provides a method of inhibiting scaling in an aqueous system by adding a sulfonated graft copolymer according to the present invention to the aqueous system. The scale inhibitor may be injected or squeezed, or may be added topside to the produced water. The invention is also directed towards a mixture of the sulfonated graft copolymer and a carrier fluid. Examples of suitable carrier fluids include water, glycol, alcohol and/or oil. In one aspect the carrier fluid is water, brines, or methanol. Methanol is often used to prevent the formation of water methane ice structures downhole. In another embodiment, sulfonated graft copolymers according to the present invention are soluble in methanol, enabling the scale inhibiting polymers to be introduced into the well bore through the methanol line. This is particularly advantageous as there are a fixed number of lines that run in to the wellbore, and this combination eliminates the need for another line. Sulfonated graft copolymers according to the invention can have at least about 10 weight % saccharide functionality, based on total polymer weight. In another aspect, the copolymers have at least about 20 weight % saccharide functionality for solubility in methanol.

Examples of aqueous systems include cooling water systems, water flood systems, and produced water systems. The aqueous environment may also be in crude oil systems or gas systems, and can be deployed downhole, topside, pipeline or during refining. Aqueous systems can include $CO_2$, $H_2S$, $O_2$, brine, condensed water, crude oil, gas condensate, or any combination of the said or other species. Copolymers according to the present invention can be deployed into such systems continuously or intermittently in a batch-wise manner.

In one embodiment copolymers according to the present invention are added topside and/or in a squeeze treatment. In the latter, also called a "shut-in" treatment, the scale inhibitor is injected into the production well, usually under pressure, and "squeezed" into the formation and held there. In the squeeze procedure, scale inhibitor is injected several feet radially into the production well where it is retained by adsorption and/or formation of a sparingly soluble precipitate. The inhibitor slowly leaches into the produced water over a period of time and protects the well from scale deposition. Shut-in treatments should be done regularly (e.g., one or more times a year) if high production rates are to be maintained and constitute the "down time" when no production takes place. Copolymers according to the present invention are particularly good for this type of squeeze scale inhibition due to their saccharide functionality, which can be absorbed on to the formation and released over time.

Copolymers according to the present invention can be used for scale inhibition where the scale inhibited is calcium carbonate, halite, calcium sulfate, barium sulfate, strontium sulfate, iron sulfide, lead sulfide and zinc sulfide and mixtures thereof. Halite is the mineral form of sodium chloride, commonly known as rock salt.

In order to facilitate a clear understanding thereof, further description of the additives, compositions and methods of this invention are provided in the examples below.

The polymers of this invention can also be used in cementing and concrete applications. The polymers function as dispersants in these applications. In downhole cementing applications, these polymers will act as fluid loss additives as well as cement set retarders. These polymers can be used as a dispersant or a fluid loss additive in drilling mud applications.

Dispersant for Particulates

Polymers according to the present invention can be used as a dispersant for minerals in applications such as paper coatings, paints and other coating applications. These particulates are found in a variety of applications, including but not limited to, paints, coatings, plastics, rubbers, filtration products, cosmetics, cement and concrete, food and paper coatings. Examples of minerals that can be dispersed by the inventive polymers include titanium dioxide, kaolin clays, modified kaolin clays, calcium carbonates and synthetic calcium carbonates, iron oxides, carbon black, talc, mica, silica, silicates, and aluminum oxide. Typically, the more hydrophobic the mineral the better polymers according to the present invention perform in dispersing particulates.

Fiberglass Sizing

In yet even another application, sulfonated graft copolymers according to the present invention can be used as a binder for fiberglass. Fiberglass insulation products are generally formed by bonding glass fibers together with a synthetic polymeric binder. Fiberglass is usually sized with phenol-formaldehyde resins or polyacrylic acid based resins. The former has the disadvantage of releasing formaldehyde during end use. The polyacrylic acid resin system has become uneconomical due to rising crude oil prices. Hence, there is a need for renewal sizing materials in this industry. The sulfonated graft polymers of this invention are a good fit for this application. They can be used by themselves or in conjunction with the with the phenol formaldehyde or polyacrylic acid binder system.

The binder composition is generally applied by means of a suitable spray applicator to a fiber glass mat as it is being formed or soon after it is formed and while it is still hot. The spray applicator aids in distributing the binder solution evenly throughout the formed fiberglass mat. The polymeric binder solution tends to accumulate at the junctions where fibers cross each other, thereby holding the fibers together at these junctions. Solids are typically present in the aqueous solution in amounts of about 5 to 25 percent by weight of total solution. The binder can also be applied by other means known in the art, including, but not limited to, airless spray, air spray, padding, saturating, and roll coating.

Residual heat from the fibers volatizes water away from the binder. The resultant high-solids binder-coated fiberglass mat is allowed to expand vertically due to the resiliency of the glass fibers. The fiberglass mat is then heated to cure the binder. Typically, curing ovens operate at a temperature of from 130° C. to 325° C. However, the binder composition of the present invention can be cured at lower temperatures of from about 110° C. to about 150° C. In one aspect, the binder composition can be cured at about 120° C. The fiberglass mat is typically cured from about 5 seconds to about 15 minutes.

In one aspect the fiberglass mat is cured from about 30 seconds to about 3 minutes. The cure temperature and cure time also depend on both the temperature and level of catalyst used. The fiberglass mat can then be compressed for shipping. An important property of the fiberglass mat is that it returns substantially to its full vertical height once the compression is removed. The sulfonated graft polymer based binder produces a flexible film that allows the fiberglass insulation to bounce back after a roll is unwrapped for use in walls/ceilings.

Fiberglass or other non-wovens treated with the copolymer binder composition is useful as insulation for heat or sound in the form of rolls or batts; as a reinforcing mat for roofing and flooring products, ceiling tiles, flooring tiles, as a microglass-based substrate for printed circuit boards and battery separators; for filter stock and tape stock and for reinforcements in both non-cementatious and cementatious masonry coatings.

Low molecular weight sulfonated graft copolymers are exemplified in U.S. Pat. No. 5,580,941. These copolymers are made using mercaptan and/or amine chain transfer agents. The chain transfer agents lower the molecular weight but in the process generate synthetic polymers. These mercaptans stop a growing chain Equation 1 and start a new polymer chain Equation 2, which is illustrated in the mechanism below (Odian, George, PRINCIPLES OF POLYMERIZATION, $2^{nd}$ Ed., Wiley-Interscience, New York, p. 226 (1981))—

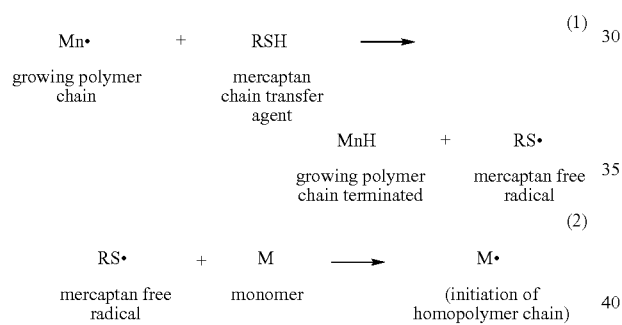

This new chain is now comprised of ungrafted synthetic copolymers.

Additionally, the materials exemplified in this patent are synthesized using amines such as hydroxylamine chloride as part of the redox initiating system. The free radicals generated from the reaction of the amine with the hydrogen peroxide lead to homopolymer formation. This reaction competes with the grafting reaction which is the reaction of hydroxyls on the saccharide reacting with the Fe (II) and the hydrogen peroxide to form free radicals on the saccharide which leads to the formation of the graft copolymer. The combination of the amine in the initiator system and the mercaptan chain transfer agent results in a relatively high amount of homopolymer. This homopolymer especially in the neutralized form is incompatible with polysaccharides resulting in the phase separation seen in Comparative Example 1. However, if the amine initiating system and the mercaptan chain transfer agent are not employed, stable aqueous solutions are obtained even with polysaccharides (Example 1).

The performance of these materials is mainly due to the ungrafted synthetic copolymers generated in this process. This is the reason they exemplify relatively low amounts of saccharide (40 wt% or less). Higher amounts of the saccharide will phase separate. Secondly, the calcium binding data in Table 4 (Column 14) is inversely proportional to the amount of saccharide functionality. This indicates that the material is mostly a mixture of synthetic copolymer and saccharide with little to no grafting. Saccharide contribution to calcium binding is negligible.

TABLE 2

| Polymer of '941 patent | Ca binding from Table 4 of '941 patent mg CaCO$_3$/g polymer | wt % saccharide in polymer |
| --- | --- | --- |
| 1 | 1898 | 30 |
| 2 | 990 | 40 |
| 12 | >3000 | 9.7 |

Finally, Comparative Examples 3 and 5 at columns 11 and 12 of the '941 patent forms a precipitate when higher molecular weight saccharide is used (here, maltodextrins with DE 14 and 20). This illustrates that there is little grafting and the resulting synthetic polymer is phase separating from the maltodextrin. This does not happen with the other Examples because they use disaccharides such as glucose, which are small molecules and are compatible.

In contrast, polymers according to the present invention are made with polysaccharides with molecular weights greater than DE 20 (see, e.g., Example 1, 3 and 5) and are compatible, indicating a high degree of grafting.

EXAMPLES

Example 1

Sulfonated Graft Copolymer with Maltodextrin, (a Polysaccharide) (Polymerized without the use of Mercaptan Chain Transfer Agent)

156 g of water, 49 g of maltodextrin (Cargill MD™ 01918 maltodextrin, DE 18) and 0.0039 g of ferrous ammonium sulfate hexahydrate (FAS) were heated to 98° C. in a reactor. A mixed solution of 81.6 g of acrylic acid (AA) and 129.2 g of a 50% solution of sodium 2-acrylamido-2-methyl propane sulfonate (AMPS) was added to the reactor over a period of 45 minutes. An initiator solution of 13 g of 35% strength hydrogen peroxide in 78 g of deionized water was simultaneously added to the reactor over a period of 60 minutes. The reaction product was held at 98° C. for an additional hour, neutralized by adding 27.2 g of a 50% solution of sodium hydroxide, and cooled. The final product was a clear yellow solution. The number average molecular weight of this polymer was 68,940 and a pH of 5.1.

This sample remained a clear solution with no sign of precipitation even after 6 months. However a blend of Alcosperse 545 (AA-AMPS copolymer) and Cargill MD™ 01918 maltodextrin phase separates within a day. This is similar to the phase separation seen in Comparative Example 5 of '941 when a maltodextrin of DE 20 (even though this a lower molecular weight than that used in our recipe) is used. This indicates that the '941 Comparative Example 5 has very little graft copolymer due to the presence of mercaptan, resulting in lots of synthetic copolymer.

Further, a blend of Alcosperse 545 and saccharose or sucrose is phase stable. This is due to the fact that the latter is a small molecule and is very compatible. This supports our assertion that the materials of Examples 1, 2 and 12 of '941, due to the presence of mercaptans and organic amine initiators used in their formation, are mostly synthetic copolymers blended with the saccharose. The performance of these polymers in the Table 1 above supports this assertion.

Example 2

Example 1 was repeated with the exception that 0.39 g of FAS was used. The final product was a clear amber solution.

Example 3

Sulfonated Graft Copolymer with Maltose at High Levels of Saccharide (85 wt %)

160 g of water, 207.8 g of Cargill Sweet Satin Maltose (80% solution) and 0.00078 grams of copper sulfate pentahydrate were heated in a reactor to 98° C. A mixed solution containing 16.4 g of AA and 25.9 grams of a 50% solution of sodium 2-acrylamido-2-methyl propane sulfonate (AMPS) was added to the reactor over a period of 45 minutes. The saccharide was 85 weight percent of the total weight of saccharide and monomer (acrylic acid+AMPS). An initiator solution comprising 13 grams of 35% hydrogen peroxide solution in 78 grams of deionized water was simultaneously added to the reactor over a period of 60 minutes. The reaction product was held at 98° C. for an additional hour. The polymer was then neutralized by adding 8 grams of a 50% solution of NaOH. The final product was a clear yellow solution. This sample has been a clear solution and shows no sign of precipitation even after 6 months.

Example 4

Sulfonated Graft Copolymer with Maltose at High Levels of Polysaccharide (75 wt %)

180 g of water and 146 g of maltodextrin (Cargill MD™ 01960 maltodextrin, DE 11) and 0.0013 g of copper sulfate pentahydrate were heated in a reactor to 98° C. A mixed solution containing 27.3 g of acrylic acid and 43.2 g of a 50% solution of AMPS was added to the reactor over a period of 45 minutes. (The saccharide comprised 75 wt % of the total wt % of saccharide and monomer (acrylic acid+AMPS).) An initiator solution of 13 g of 35% hydrogen peroxide solution in 78 g of deionized water was simultaneously added to the reactor over a period of 60 minutes. The reaction product was held at 98° C. for an additional hour. The polymer was then neutralized by adding 27 g of a 50% solution of NaOH to a pH of about 7. The final product was a clear yellow solution. This sample remained a clear solution with no sign of precipitation even after 6 months.

Example 5

One-Wash Anti-Redeposition Data using Commercial Sun Liquid Detergent

Testing was conducted in a full scale washing machine using 3 cotton and 3 polyester/cotton swatches. The soil used was 17.5 g rose clay, 17.5 g bandy black clay and 6.9 g oil blend (75:25 vegetable/mineral). The test was conducted for 3 cycles using 100 g powder detergent per wash load. The polymers were dosed in at 1.0 weight % of the detergent. The wash conditions used a temperature of 33.9° C. (93° F.), 150 ppm hardness and a 10 minute wash cycle.

L (luminance) a (color component) b (color component) values before the first cycle and after the third cycle were measured as $L_1$, $a_1$, $b_1$, and $L_2$, $a_2$, $b_2$, respectively, using a spectrophotometer. Delta whiteness index is calculated using the L, a, b values above. Lower Delta WI (whiteness index) numbers are indicative of better performance.

TABLE 2

| | | Delta WICIE (Whiteness Index) | | | | |
|---|---|---|---|---|---|---|
| Sample | Description | Cotton Plain weave | Poly/cotton Plain weave | Polyester Double knit | Cotton Interlock | Nylon woven |
| Control | No polymer | 6.61 | 5.12 | 11.31 | 12.89 | 3.47 |
| Alcosperse 602N | Na polyacrylate | 4.05 | 3.53 | 5.71 | 8.31 | 1.62 |
| Example 1 | AMPS-AA mixed feed | 4.45 | 4.05 | 7.30 | 10.31 | 2.62 |

The above data indicates that the polymer of Example 1 performs much better than the Control, and performed nearly as well as the sodium polyacrylate, which is the industry standard for this application.

Example 6

Sulfonated Copolymer using 100% Sulfonated Monomers 90 g of water and 65 g of maltodextrin (Cargill MD™ 01960 maltodextrin, DE 11) and 0.00075 g of ferrous ammonium sulfate hexahydrate (FAS) were heated in a reactor to 98° C. A solution containing 100 g of sodium styrene sulfonate dissolved in 500 g of water was added over 150 minutes. An initiator solution comprising 3.6 g of 35% hydrogen peroxide solution in 30 grams of deionized water was simultaneously added to the reactor over a period of 165 minutes. The reaction product was held at 98° C. for an additional hour. The final product was a clear water white solution. The number average molecular weight of this polymer was 4,202. This sample has been a clear solution and shows no sign of precipitation even after 4 months.

Example 7

Sulfonated Copolymer Grafted on to Small Molecule Natural Alcohol 80 g of water, 15 g of glycerol and 0.0012 g of ferrous ammonium sulfate hexahydrate (FAS) were heated in a reactor to 98° C. A mixed solution containing 16.3 g of acrylic acid and 25.9 g of a 50% solution of sodium 2-acrylamido- 2-methyl propane sulfonate (AMPS) was added to the reactor over a period of 45 minutes. An initiator solution comprising 13 g of 35% hydrogen peroxide solution in 30 g of deionized water was simultaneously added to the reactor over a period of 60 minutes. The reaction product was held at 98° C. for an additional hour. The reaction product was cooled and neutralized with 6 g of a 50% NaOH solution.

Example 8

Sulfonated Copolymer using a Mixture of Carboxylated Monomers Grafted on to a Polysaccharide 263 g of water, 31.9 g of maleic anhydride, 51.5 g of sodium methallyl sulfonate, 47 g of maltodextrin (Cargill MD™ 01960 maltodextrin, DE 11) and 0.0022 g of copper sulfate pentahydrate were heated in a reactor to 98° C. A solution containing 178 g of acrylic acid dissolved in 142 g of water was added over 150 minutes. An initiator solution comprising 23.8 g of 35% hydrogen peroxide solution in 37 g of deionized water was simultaneously added to the reactor over a period of 180 minutes. The reaction product was held at 98° C. for an additional hour. The reaction product was cooled and neutralized with 90 g of a 50% NaOH solution. The final product was a clear yellowish amber solution.

Comparative Example 1

Synthesis of Copolymer using Grafting Recipe Adapted from Example 2 of U.S. Pat. No. 5,227,446

263.1 g of water, 80 g of maltodextrin (Cargill MD™ 01960, soluble component 90%, DE value of 11 to 14), 63.8 g of maleic anhydride, 0.00075 g (3.5 g of a 0.1% strength) aqueous FAS solution and 94 g of 50% strength aqueous sodium hydroxide solution are heated to a boil in a reactor equipped with stirrer, reflux condenser, thermometer, feed devices, and nitrogen inlet and outlet. The degree of neutralization of maleic acid produced from the maleic anhydride in aqueous solution is 90.2%. Once the reaction mixture has started boiling, a solution of 178.2 g of acrylic acid in 141.9 g of water is added over the course of 5 hours, and a solution of 16.6 g of 50% strength hydrogen peroxide in 44.4 g of water is added at a constant rate over the course of 6 hours at the boil. When the addition of acrylic acid is complete, the degree of neutralization of the maleic acid and acrylic acid units present in the polymer is 31.1%. When the addition of hydrogen peroxide is complete, the reaction mixture is heated at a boil for an additional hour, neutralized to a pH of 7.2 by adding 180 g of 50% strength aqueous sodium hydroxide solution, and cooled.

Comparative Example 2

Synthesis of Copolymer using Grafting Recipe Adapted from Example 25 of U.S. Pat. No. 5,227,446

290 g of maltodextrin having a DE value of from 11 to 14, 470 g of water, 4.2 ml of a 0.1% strength aqueous solution of FAS, 101.38 g of maleic anhydride and 74.52 g of sodium hydroxide are introduced into a reactor and heated to boil. The degree of neutralization of the resultant maleic acid is 90%. Immediately after boiling commences, a mixture of 120 g of acrylic acid and 114.4 g of a 58% strength aqueous solution of the sodium salt of acrylamido methyl propane sulfonic acid is added over the course of 5 hours, and 80 g of 30% hydrogen peroxide and a solution of 24 g of sodium persulfate in 72 g of water are added over the course of 6 hours, in each case at a constant rate and the mixture is polymerized at the boiling point. After the addition of initiator is complete, the reaction mixture is heated at boil for a further 1 hour. The degree of neutralization of the acid groups is 53.5%. After the polymerization is complete, the reaction mixture is neutralized by adding 155 g of 50% strength aqueous sodium hydroxide solution.

Example 9

Calcium Ortho-Phosphate Inhibition

The polymers in Example 2 and Comparative Example 1 were compared in this test. Phosphate inhibition data is based upon using 20 ppm orthophosphate and 150 ppm polymer in the aqueous treatment system.
Phosphate Inhibition Test Protocol
Solution "A"
Using sodium hydrogen phosphate and sodium tetraborate decahydrate, Solution A was prepared containing 20 mg/L of phosphate, and 98 mg/L of borate at a pH of from 8.0-9.5.
Solution "B"
Using calcium chloride dihydrate and ferrous ammonium sulfate, Solution B was prepared containing 400 mg/L of calcium and 4 mg/L of iron at a pH of from 3.5-7.0.
Anti-Scalant Preparation
The total solids or activity for anti-scalant(s) to be evaluated was determined as follows. The weight of anti-scalant necessary to provide a 1.000 g/L (1000 mg/L) solids/active solution was determined using the following formula:

$$(\% \text{ solids or activity})/100\% = \text{``}X\text{''}$$

wherein "X"=decimal solids or decimal activity. (1.000 g/L)/ "X"=g/L anti-scalant required to yield a 1000 mg/L anti-scalant solution.
Sample Preparation
Fifty (50) ml of Solution "B" was dispensed into a 125 ml Erlenmeyer flask using a Brinkman dispensette. Using a graduated piper, the correct amount of anti-scalant polymer solution was added to give the desired treatment level (i.e., 1 ml of 1000 mg/L anti-scalant solution=10 mg/L in samples). Fifty (50) ml of Solution "A" was dispensed into the 125 ml Erlenmeyer flask. At least three blanks (samples containing no anti-scalant treatment) were prepared by dispensing 50 ml of Solution "B" and 50 ml of Solution "A" into a 125-ml Erlenmeyer flask. The flasks were then stoppered and placed in a water bath set at 70° C., ±5° C., for 16 to 24 hours.
Sample Evaluation
All of the flasks were removed from the water bath and allowed to cool to touch. A vacuum apparatus was assembled using a 250-ml side-arm Edenmeyer flask, vacuum pump, moisture trap, and Gelman filter holder. The samples were filtered using 0.2-micron filter paper. The filtrate from the 250-ml side-arm Erlenmeyer flask was transferred into an unused 100-ml specimen cup. The samples were evaluated for phosphate inhibition using a HACH DR/3000 Spectrophotometer, following the procedure set forth in the operator's manual.
Calculation of Percent Inhibition for All Samples
The percent inhibition for each treatment level is determined by using the following calculation $$\% \text{ Phosphate inhibition} = (S/T) * 100$$

wherein S=mg/L Phosphate for Sample and T=mg/L Total Phosphate added.

TABLE 3

Percent Phosphate Inhibition

| Polymer | % Ca phosphate inhibition |
|---|---|
| Comparative Example 1 | 8 |
| Example 2 | 92 |
| Aquatreat 545 | 98 |

The data indicates that polymers of this invention are superior to those of U.S. Pat. No. 5,227,446 in minimizing scale, especially ortho phosphate scale.

Example 10

The polymers of Example 2 and Comparative Example 1 were tested in the following autodish formulation below for filming and spotting in an automatic dishwasher using ASTM D3556. The formulation used was—

| Ingredient | wt % |
|---|---|
| Sodium tripolyphosphate | 25.0 |
| Sodium carbonate | 25.0 |
| Non ionic surfactant | 1.0 |
| Polymer | 4.0 |
| Sodium sulfate | 45.0 |

The test used a mixture of glasses and plastic tumblers. The soil was 80% margarine and 20% dry milk, which was blended and then smeared on to the surface of the glasses. Soil loading was 40 grams per load. Detergent loading was 40 grams per wash. Water hardness was 350 ppm with a Ca to Mg ratio of 2:1. The test used 4% active polymers of Example 1 and Comparative Example 1. Filming and spotting were visually rated on a scale of 1 to 5, with 1 being the worst and 5 being the best. The visual results of the testing after a total of 3 wash cycles are listed in Table 4.

TABLE 4

Visual results of the autodish tests

| Polymer | Filming | Spotting |
|---|---|---|
| Comparative Example 1 | 2 | 3 |
| Example 2 | 3.5 | 4 |
| Control (no polymer) | 1 | 1 |

Example 11

The polymers of Example 2 and Comparative Example 2 were tested for calcium phosphate inhibition according to the inhibition test detailed in Example 9.

TABLE 4

Calcium phosphate inhibition results

| Polymer | Level of polymer (ppm) | % Ca phosphate inhibition |
|---|---|---|
| Comparative Example 2 | 50 | 2 |
| Example 2 | 50 | 98 |

The data above indicates that the sulfonated polymers of this invention are far superior to the dicarboxylic-containing sulfonated polymer of the '446 patent.

Example 12

One-cycle soil anti-redeposition test using the test procedure of Example 5 under the following conditions
One wash/dry cycle
92 g Sun liquid detergent
0.5% starch or polymer, where specified
17.5 g rose clay, 17.5 g black charm clay
6.9 g oil blend (50:50 vegetable/mineral)
150 ppm H$_2$O, 93° F., 10 minute wash
3—cotton 419W swatches
3—poly/cotton swatches
3—polyester double knit swatches
3—cotton interlock swatches
3—Woven nylon swatches

TABLE 5

Anti-redeposition

| | Delta WICIE (Whiteness Index) | | | | |
|---|---|---|---|---|---|
| Sample | Cotton Plain weave | Poly/cotton Plain weave | Polyester Double knit | Cotton Interlock | Nylon woven |
| Control (no polymer) | 4.41 | 6.98 | 13.17 | 19.93 | 3.32 |
| Alcosperse 602N | 4.34 | 4.05 | 5.57 | 12.46 | 2.37 |
| Example 3 | 2.44 | 2.24 | 2.28 | 10.09 | 0.53 |
| Example 4 | 2.15 | 2.80 | 2.67 | 9.30 | 0.63 |

The data indicates that polymers according to the present invention perform better than standard polyacrylate (ALCOSPERSE 602N).

Examples 13 to 15

Granular Powder Laundry Detergent Formulations

TABLE 6

Powdered Detergent Formulations

| Ingredient | Example 13 (wt %) | Example 14 (wt %) | Example 15 (wt %) |
|---|---|---|---|
| Anionic surfactant | 22 | 20 | 10.6 |
| Non-ionic surfactant | 1.5 | 1.1 | 9.4 |
| Cationic surfactant | — | 0.7 | — |
| Zeolite | 28 | — | 24 |
| Phosphate | — | 25 | — |
| Silicate | — | — | 8.5 |
| Sodium carbonate/bicarbonate | 27 | 14 | 9 |
| Sulfate | 5.4 | 15 | 11 |

TABLE 6-continued

Powdered Detergent Formulations

| Ingredient | Example 13 (wt %) | Example 14 (wt %) | Example 15 (wt %) |
|---|---|---|---|
| Sodium silicate | 0.6 | 10 | — |
| Polyamine | 4.3 | 1.9 | 5 |
| Brighteners | 0.2 | 0.2 | — |
| Sodium perborate | | 1 | |
| Sodium percarbonate | 1 | — | — |
| Sodium hypochlorite | | | 1 |
| Suds suppressor | 0.5 | 0.5 | — |
| Bleach catalyst | 0.5 | — | |
| Polymer of Example 1 | 1 | | |
| Polymer of Example 3 | | 5 | |
| Polymer of Example 6 | | | 2 |
| Water and others | Balance | Balance | Balance |

Example 16

Hard Surface Cleaning Formulations

Acid Cleaner

| Ingredient | wt % |
|---|---|
| Citric acid (50% solution) | 12.0 |
| Phosphoric acid | 1.0 |
| $C_{12}$-$C_{15}$ linear alcohol ethoxylate with 3 moles of EO | 5.0 |
| Alkyl benzene sulfonic acid | 3.0 |
| Polymer of Example 5 | 1.0 |
| Water | 78.0 |

Alkaline Cleaner

| Ingredient | wt % |
|---|---|
| Water | 89.0 |
| Sodium tripolyphosphate | 2.0 |
| Sodium silicate | 1.9 |
| NaOH (50%) | 0.1 |
| Dipropylene glycol monomethyl ether | 5.0 |
| Octyl polyethoxyethanol, 12-13 moles EO | 1.0 |
| Polymer of Example 3 | 1.0 |

Example 17

Automatic Dishwash Powder Formulation

| Ingredients | wt % |
|---|---|
| Sodium tripolyphosphate | 25.0 |
| Sodium carbonate | 25.0 |
| C12-15 linear alcohol ethoxylate with 7 moles of EO | 3.0 |
| Polymer of Example 2 | 4.0 |
| Sodium sulfate | 43.0 |

Example 18

Automatic Phosphate-Free Dishwash Powder Formulation

| Ingredients | wt % |
|---|---|
| Sodium citrate | 30 |
| Polymer of Example 1 | 10 |
| Sodium disilicate | 10 |
| Perborate monohydrate | 6 |
| Tetra-acetyl ethylene diamine | 2 |
| Enzymes | 2 |
| Sodium carbonate | 30 |

Example 19

Handwash Fabric Detergent

| Ingredients | wt % |
|---|---|
| Linear alkyl benzene sulfonate | 15-30 |
| Nonionic surfactant | 0-3 |
| Na tripolyphosphate (STPP) | 3-20 |
| Na silicate | 5-10 |
| Na sulfate | 20-50 |
| Bentonite clay/calcite | 0-15 |
| Polymer of Example 3 | 1-10 |
| Water | Balance |

Example 20

Bar/Paste for Laundering

| Ingredients | wt % |
|---|---|
| Linear alkylbenzene sulfonate | 15-30 |
| Na silicate | 2-5 |
| STPP | 2-10 |
| Polymer of Example 1 | 2-10 |
| Na carbonate | 5-10 |
| Calcite | 0-20 |
| Urea | 0-2 |
| Glycerol | 0-2 |
| Kaolin | 0-15 |
| Na sulfate | 5-20 |
| Perfume, FWA, enzymes, water | Balance |

Example 21

Liquid Detergent Formulation

| Ingredients | wt % |
|---|---|
| Linear alkyl benzene sulfonate | 10 |
| Alkyl sulfate | 4 |
| Alcohol ($C_{12}$-$C_{15}$) ethoxylate | 12 |
| Fatty acid | 10 |

-continued

| Ingredients | wt % |
|---|---|
| Oleic acid | 4 |
| Citric acid | 1 |
| NaOH | 3.4 |
| Propanediol | 1.5 |
| Ethanol | 5 |
| Polymer of Example 5 | 1 |
| Ethanol oxidase | 5 u/ml |
| Water, perfume, minors | up to 100 |

Example 22

Water Treatment Compositions

Once prepared, water-soluble polymers are incorporated into a water treatment composition comprising the sulfonated graft copolymer and other water treatment chemicals. Other water treatment chemicals include corrosion inhibitors such as orthophosphates, zinc compounds and tolyl triazole. The level of inventive polymer utilized in water treatment compositions is determined by the treatment level desired for the particular aqueous system treated. Water soluble polymers generally comprise from 10 to 25 percent by weight of the water treatment composition. Conventional water treatment compositions are known to those skilled in the art, and exemplary water treatment compositions are set forth in the four formulations below. These compositions containing the polymer of the present invention have application in, for example, the oil field.

| Formulation 1 | Formulation 2 |
|---|---|
| 11.3% of Polymer of Ex. 1 | 11.3% Polymer of Ex. 4 |
| 47.7% Water | 59.6% Water |
| 4.2% HEDP | 4.2% HEDP |
| 10.3% NaOH | 18.4% TKPP |
| 24.5% Sodium Molybdate | 7.2% NaOH |
| 2.0% Tolyl triazole | 2.0% Tolyl triazole |
| pH 13.0 | pH 12.64 |

| Formulation 3 | Formulation 4 |
|---|---|
| 22.6% of Polymer of Ex. 3 | 11.3% Polymer of Ex. 1 |
| 51.1% Water | 59.0% Water |
| 8.3% HEDP | 4.2% HEDP |
| 14.0% NaOH | 19.3% NaOH |
| 4.0% Tolyl triazole | 2.0% Tolyl triazole |
| pH 12.5 | 4.2% ZnCl$_2$ |
|  | pH 13.2 | where HEDP is 1-hydroxyethylidene-1,1 diphosphonic acid and TKPP is tri-potassium polyphosphate.

Example 23

The polymers of Example 4 and a sulfonated synthetic polymer Aquatreat AR 545 (commercially available from Alco Chemical, Chattanooga, Tenn.) were tested for calcium phosphate inhibition according to the inhibition test detailed in Example 9.

TABLE 7

Calcium phosphate inhibition results

| Polymer | Level of polymer (ppm) | % Ca phosphate inhibition |
|---|---|---|
| Aquatreat AR 545 | 50 | 98 |
| Example 4 | 50 | 98 |

The data indicate that the Example 4 polymer according to the present invention and having a high amount of saccharide (75 wt % of the total polymer weight) performs similar to a commercial wholly synthetic polymer.

Example 24

Example 1 was repeated with the exception that the 49 g of maltodextrin (Cargill MD™ 01918 maltodextrin, DE 18) was replaced by Sweet Satin maltose 65% (from Cargill).

Example 25

Example 1 was repeated with the exception that the 49 g of maltodextrin (Cargill MD™ 01918 maltodextrin, DE 18) was replaced by Sweet Satin maltose 65% (from Cargill).

Example 26

Brine compatibility of a number of polymers were tested in Brine 3, the composition of which is listed in Table 1. The data shown for these compatibility tests are shown below.

| Inhibitor | Natural Component | Polymer Concentration (ppm) | Brine 3 Observation after - 0 hr, 21° C. | 1 hr, 60° C. | 2 hr, 90° C. | 24 hr, 90° C. |
|---|---|---|---|---|---|---|
| Example 1 | Maltodextrin DE 18 | 5,000 | Y | UH | UH | Y |
|  |  | 25,000 | UH | UH | UH | R ppt |
|  |  | 100,000 | UH | UH | UH | Y |
| Example 24 | maltose | 5,000 |  | UH | UH | X |
|  |  | 25,000 |  | UH | UH | X |
|  |  | 100,000 |  | UH | UH | X |
| Example 4 | Maltodextrin DE 18 | 5,000 | Y | UH | UH |  |
|  |  | 25,000 | Y | UH | UH | UH |
|  |  | 100,000 | Y | UH | UH | UH |
| Example 25 | maltose | 5,000 | Y | UH | X | X |
|  |  | 25,000 | Y | X | X | X |
|  |  | 100,000 | Y | Y | X | X |
|  |  | 25,000 | X | X | X | X |
|  |  | 100,000 | X | X | X | X |

The above data indicates that sulfonated graft copolymers produced from maltodextrin are more compatible in brines than those produced from maltose. This is evident by comparing the brine compatibility of Examples 1 and 24, and Examples 4 and 25.

Example 27

156 g of water, 90 grams of a 50% solution of NaOH, 20 g of Sweet Satin maltose 65% (available from Cargill) and 0.0039 g of ferrous ammonium sulfate hexahydrate ('FAS') were heated to 98° C. in a reactor. A mixed solution of 81.6 g of acrylic acid (AA) and 129.2 g of a 50% solution of sodium 2-acrylamido-2-methyl propane sulfonate (AMPS) was added to the reactor over a period of 45 minutes. An initiator solution of 13 g of 35% strength hydrogen peroxide in 78 g of deionized water was simultaneously added to the reactor over a period of 60 minutes. The reaction product was held at 98° C. for an additional hour.

The graft copolymer of this Example with low levels of saccharide functionality (less than 10 weight percent) was tested for brine compatibility in Brine 3. This polymer was found to be insoluble in Brine 3 when dosed at 250, 1,000, 5,000, 25,000 and 100,000 ppm levels.

Although the present invention has been described and illustrated in detail, it is to be understood that the same is by way of illustration and example only, and is not to be taken as a limitation. The spirit and scope of the present invention are to be limited only by the terms of any claims presented hereafter.

We claim:

1. A sulfonated graft copolymer comprising:
    one or more synthetic monomers, wherein the one or more synthetic monomers is at least one monoethylenically unsaturated sulfonated monomer having a sulfonic acid group or salt thereof, wherein the sulfonated monomer is about 2 to about 50 percent by weight of the total synthetic monomer weight of the copolymer; and
    a hydroxyl-containing naturally derived material selected from the group consisting of corn syrups and maltodextrins,
    wherein the one or more synthetic monomers and hydroxyl-containing naturally derived materials are present in a weight ratio of 50:50 to 10:90, respectively, and
    wherein the sulfonated graft copolymer is obtained by radical graft copolymerization of the one or more synthetic monomers in the presence of the hydroxyl-containing naturally derived material; and wherein the sulfonated graft copolymer further comprises 5 to 90 wt %, based on total weight of the one or more synthetic monomers, of at least one monoethylenically unsaturated $C_3$-$C_{10}$ carboxylic acid, or salt thereof, or 0.1 to 50 wt %, based on total weight of the one or more synthetic monomers, of at least one monoethylenically unsaturated $C_4$-$C_{10}$ dicarboxylic acid, or salt thereof 2. The sulfonated graft copolymer according to claim 1, wherein the one or more synthetic monomers and hydroxyl-containing naturally derived materials are present in a weight ratio of 40:60 to 10:90, respectively.

3. The sulfonated graft copolymer according to claim 1 wherein the synthetic monomers further comprise one or more monomers having a nonionic, hydrophobic and/or carboxylic acid group, wherein the one or more monomers are incorporated into the copolymer in an amount of about 10 wt % or less based on total weight of the graft copolymer.

4. The sulfonated graft copolymer according to claim 1 wherein the hydroxyl-containing naturally derived material is water soluble.

5. The sulfonated graft copolymer according to claim 1 wherein the sulfonated monomer is selected from the group consisting of 2-acrylamido-2-methyl propane sulfonic acid, vinyl sulfonic acid, sodium (meth)allyl sulfonate, sulfonated styrene, (meth)allyloxybenzene sulfonic acid, sodium 1-allyloxy 2 hydroxy propyl sulfonate and combinations thereof.

6. The sulfonated graft copolymer according to claim 1 where the hydroxyl-containing naturally derived material is a maltodextrin.

7. A water soluble copolymer composition comprising the graft copolymer of claim 1 and an adjunct ingredient selected from the group consisting of water, builders, surfactants, bleaching agents, bleach modifying materials, carriers, acids, corrosion inhibitors, aesthetic agents, phosphates, sodium carbonate, citrates, buffers, chelants, filler salts, dispersants, enzymes, enzyme boosters, perfumes, thickeners, clays, solvents, hydrotropes, bleaching agents, bleach precursors, buffering agents, soil removal agents, soil release agents, fabric softening agent, opacifiers, water treatment chemicals, orthophosphates, zinc compounds, tolyltriazole, minerals, clays, salts, metallic ores, metallic oxides, talc, pigments, titanium dioxide, mica, silica, silicates, carbon black, iron oxide, kaolin clay, modified kaolin clays, calcium carbonate, synthetic calcium carbonates, fiberglass, drilling muds, viscosifiers, weighting materials, cement and aluminum oxide.

8. The composition of claim 7 wherein the formulation is selected from the group consisting of a cleaning formulation, a fiberglass binder formulation, an oil field application formulation, a water treatment formulation, a scale inhibition formulation, a dispersant formulation, a drilling fluid formulation, a spacer fluid formulation and a cement formulation.

9. The composition of claim 8 wherein the cleaning formulation is a detergent, fabric cleaner, automatic dishwashing detergent, glass cleaner, hard surface cleaner or a laundry detergent.

10. The composition of claim 9 wherein the automatic dishwashing detergent is a zero-phosphate or low phosphate formulation.

11. A method of cementing a subterranean zone penetrated by a well bore comprising:
    preparing a cement composition comprising a hydraulic cement, water in an amount effective to form a slurry, and the graft copolymer of claim 1;
    placing the cement composition in the subterranean zone; and
    allowing the cement composition to set therein.

12. A method of controlling scale in aqueous systems comprising adding the sulfonated graft copolymer according to claim 1 to an aqueous system.

13. The method of controlling scale in aqueous systems according to claim 12 wherein the copolymer is effective to inhibit formation of scale formed by calcium carbonate, halite, calcium phosphate, calcium sulfate, barium sulfate, strontium sulfate, iron sulfide, lead sulfide, zinc sulfide or mixtures thereof.

14. The method of controlling scale in aqueous systems according to claim 12 further comprising injecting the sulfonated graft copolymer into an oil-bearing rock formation matrix, wherein the aqueous systems are in an oil field application.

15. The method of controlling scale in aqueous systems according to claim 12 further comprising adding the sulfonated graft copolymer topside to production water, and re-injecting the production water into the oil-bearing rock formation matrix, wherein the aqueous systems are in an oil field application.

16. The method of controlling scale in aqueous systems according to claim 12 further comprising introducing the sulfonated graft polymer to the aqueous system in a carrier fluid.

17. The method of controlling scale in aqueous systems according to claim 16 wherein the carrier fluid is methanol.

18. A method for displacing drilling fluid from a wellbore space occupied by the drilling fluid comprising:
  displacing the drilling fluid with a spacer fluid comprising the graft polymer of claim 1 and water;
  and displacing at least a portion of the spacer fluid with a settable cement composition.

19. The method for displacing drilling fluid according to claim 18 wherein the spacer fluid comprises from about 1 to about 10 pounds of dispersant per barrel of spacer fluid.

20. The method according to claim 18 wherein the spacer fluid further comprises:
  a cementitious material; and
  a viscosifier selected from the group consisting of from welan gum, xanthan gum, hydroxyethyl cellulose, carboxymethylhydroxyethyl cellulose, attapulgite, partially hydrolyzed polyacrylamide; sepiolite, bentonite, acrylamide, acrylic acid, 2-acrylamido-2-methylpropane sulfonic acid copolymers, polyvinylpyrrolidone, silicate extenders and mixtures thereof.

21. The method according to claim 18 wherein the spacer fluid further comprises at least one cement property modifier selected from the group consisting of nonionic water wetting surfactants, anionic water wetting surfactants, retarders, dispersants, densifiers, fluid loss additives, silica flour and mixtures thereof.

22. The method according to claim 18 wherein the spacer fluid further comprises a weighting material selected from the group consisting of barite, hematite, illmenite, calcium carbonate and sand.

23. The method according to claim 18 wherein the spacer fluid further comprises at least one anionic surfactant.

24. The method according to claim 18 wherein the spacer fluid further comprises at least a nonionic surfactant.

25. A method for dispersing a plurality of particulates in an aqueous system comprising adding to the aqueous system the graft copolymer of claim 1 in an amount sufficient to disperse the plurality of particulates.

26. The method of dispersing a plurality of particulates of claim 25 wherein the particulates are selected from the group consisting of minerals, clays, salts, metallic ores, metallic oxides, dirt, soils, talc, pigments, titanium dioxide, mica, silica, silicates, carbon black, iron oxide, kaolin clay, calcium carbonate, synthetic calcium carbonates, precipitated calcium carbonate, ground calcium carbonate, precipitated silica and kaolin clay.

* * * * *